US012737841B2

(12) United States Patent
Fagbemi et al.

(10) Patent No.: US 12,737,841 B2
(45) Date of Patent: Sep. 15, 2026

(54) METHODS AND DEVICES FOR ENHANCEMENT OF POROUS MEDIA IMAGES

(71) Applicant: UNIVERSITY OF WYOMING, Laramie, WY (US)

(72) Inventors: Samuel Fagbemi, Laramie, WY (US); Mohammad Piri, Laramie, WY (US); Oubai Elagab, Laramie, WY (US)

(73) Assignee: UNIVERSITY OF WYOMING, Laramie, WY (US)

( * ) Notice: Subject to any disclaimer, the term of this patent is extended or adjusted under 35 U.S.C. 154(b) by 332 days.

(21) Appl. No.: 18/239,476

(22) Filed: Aug. 29, 2023

(65) Prior Publication Data

US 2024/0070811 A1 Feb. 29, 2024

Related U.S. Application Data

(60) Provisional application No. 63/401,990, filed on Aug. 29, 2022.

(51) Int. Cl.
*G06T 3/4053* (2024.01)
*G01N 15/08* (2006.01)
(Continued)

(52) U.S. Cl.
CPC ........... *G06T 3/4053* (2013.01); *G01N 15/08* (2013.01); *G06T 3/4046* (2013.01); *G06T 5/50* (2013.01); *G06T 7/337* (2017.01); *G06T 7/74* (2017.01); *G01N 2015/0846* (2013.01); *G06T 2207/10056* (2013.01); *G06T 2207/10081* (2013.01); *G06T 2207/20081* (2013.01); *G06T 2207/20084* (2013.01); *G06T 2207/20221* (2013.01)

(58) Field of Classification Search
None
See application file for complete search history.

(56) References Cited

U.S. PATENT DOCUMENTS

| | | | | |
|---|---|---|---|---|
| 6,128,108 A * | 10/2000 | Teo | H04N 1/3876 | 358/1.9 |
| 8,909,508 B2 * | 12/2014 | Hurley | G06T 7/11 | 703/10 |

(Continued)

FOREIGN PATENT DOCUMENTS

| | | | | |
|---|---|---|---|---|
| CN | 108387495 B * | 3/2020 | | G06T 17/00 |
| CN | 112329358 A | 2/2021 | | |
| WO | WO-2018053340 A1 * | 3/2018 | | G06T 3/4053 |

OTHER PUBLICATIONS

Fourar, et al., A viscous coupling model for relative permeabilities in fractures, SCA-9825, 9 pages.

(Continued)

*Primary Examiner* — Jiangeng Sun
(74) *Attorney, Agent, or Firm* — Patterson + Sheridan, LLP

(57) ABSTRACT

A method and system for image processing are disclosed. A method for image processing by one or more central processing units (CPU) may include detecting an overlap pattern for a set of slice images of a porous media sample, based on the overlap pattern, determining a set of overlap distances for the set of slice images of the porous media sample, and registering, based on at least the set of overlap distances, a composite image comprising any of the set of slice images of the porous media sample.

20 Claims, 16 Drawing Sheets

(51) Int. Cl.

| | |
|---|---|
| ***G06T 3/4046*** | (2024.01) |
| ***G06T 5/50*** | (2006.01) |
| ***G06T 7/33*** | (2017.01) |
| ***G06T 7/73*** | (2017.01) |

(56) References Cited

U.S. PATENT DOCUMENTS

| | | | | |
|---|---|---|---|---|
| 10,114,864 | B1 | 10/2018 | Torun | |
| 2003/0086002 | A1* | 5/2003 | Cahill | H04N 1/3876 348/218.1 |
| 2004/0204857 | A1 | 10/2004 | Ramamoorthy et al. | |
| 2004/0218830 | A1* | 11/2004 | Kang | H04N 23/741 386/E5.069 |
| 2008/0208539 | A1 | 8/2008 | Lee et al. | |
| 2011/0249910 | A1* | 10/2011 | Henderson | G06V 10/993 382/278 |
| 2013/0209954 | A1* | 8/2013 | Prakash | A61B 1/00172 433/29 |
| 2013/0259190 | A1 | 10/2013 | Walls et al. | |
| 2014/0019054 | A1 | 1/2014 | De Prisco et al. | |
| 2015/0104078 | A1* | 4/2015 | Varslot | G01N 15/088 382/109 |
| 2015/0374028 | A1 | 12/2015 | Gindrat et al. | |
| 2018/0121579 | A1 | 5/2018 | Fredrich et al. | |
| 2018/0253514 | A1 | 9/2018 | Bryant et al. | |
| 2018/0321127 | A1 | 11/2018 | León Carrera et al. | |
| 2019/0154597 | A1 | 5/2019 | Zhang | |
| 2020/0043134 | A1* | 2/2020 | Martin | G06T 3/4038 |
| 2020/0110849 | A1 | 4/2020 | Rabbani et al. | |
| 2020/0309667 | A1 | 10/2020 | Nie et al. | |
| 2021/0208051 | A1 | 7/2021 | Ju et al. | |
| 2023/0407743 | A1 | 12/2023 | Shoukry et al. | |
| 2024/0070356 | A1 | 2/2024 | Mccaskill et al. | |
| 2024/0070357 | A1 | 2/2024 | Mccaskill et al. | |

OTHER PUBLICATIONS

Frette, et al., A semi-analytical model for computation of capillary entry pressures and fluid configurations in uniformly-wet pore spaces from 2d rock images. Advances in Water Resources 33, May 11, 2010, 21 pages.

Garing et al., Pore-scale capillary pressure analysis using multi-scale x-ray micromotography, https://www.sciencedirect.com/science/article/pii/S0309170816305437, 2017, 38 pages.

Gesho, et al., Pore Network Extraction Algorithm and Geometrical Upscaling—Theoretical Description, Water Resource Research, Jun. 1, 2016, 39 pages.

Gjennestad, et al., Stable and Efficient Time Integration of a Dynamic Pore Network Model for Two-Phase Flow in Porous Media. Frontiers in Physics. Jun. 13, 2018, 16 pages.

Glass et. al., A modified invasion percolation model for low-capillary number immiscible displacements in horizontal rough-walled fractures: Influence of local in-plane curvature, Water Resources Research, vol. 34, No. 12, Dec. 1998, 20 pages.

Gong et. al., Dynamic pore-scale modeling of residual fluid configurations in disordered porous media, E3S Web of Conferences 366, 2013, https://doi.org/10.1051/e3sconf/202336601018, 13 pages.

Gong et. al., Dynamic pore-scale modeling of residual trapping in a rough-walled fracture, Transport in Porous Media, 140, May 11, 2021, 38 pages.

Gong et. al., Parallel dynamic pore-network modeling package for two-phase flow in fractures and solute transport in disordered porous media and rough-walled fractures, Dissertation, Jun. 23, 2001, 245 pages.

Gong, et al., Dynamic Pore-Scale Modeling of Residual Trapping Following Imbibition in a Rough-walled Fracture, Transport in Porous Media 140, May 11, 2021, 37 pages.

Gong, et al., Pore-to-Core Upscaling of Solute Transport Under Steady-State Two-Phase Flow Conditions Using Dynamic Pore Network Modeling Approach, Transport in Porous Media 135, Sep. 15, 2020, 38 pages.

Gong, et al., Two-Phase Relative Permeability of Rough-Walled Fractures: A Dynamic Pore-Scale Modeling of the Effects of Aperture Geometry, Water Resources Research, Nov. 18, 2021, 38 pages.

Gong, Dynamic pore network modeling of two-phase flow and solute transport in disordered porous media and rough-walled fractures, Dissertation, Dept of Petroleum Engineering, Aug. 2021, 245 pages.

Goodfellow, et al., Generative adversarial nets. Advances in Neural Information Processing Systems, https://www.github/com/goodfeli/adversarial, 9 pages.

Gostick, Versatile and efficient pore network extraction method using marker-based watershed segmentation, Phys Rev E, vol. 96, Aug. 16, 2017, 15 pages.

Guo et. al., Thermal drawdown-induced flow channelling in a single fracture in EGS, Geothermics 61, Jan. 28, 2016, 17 pages.

Hammond, et al., A Dynamic Pore Network Model for Oil Displacement by Wettability-Altering Surfactant Solution. Transp Porous Med 92, Jan. 10, 2012, 30 pages.

Hart et al, A Formal Basis for the Heuristic Determination of Minimum Cost Paths, IEEE Transactions on Systems Science and Cybernetics, vol. 4, No. 2, Jul. 1968, 8 pages.

Hassanizadeh et al, Thermodynamic basis of capillary pressure in porous media, Water resources research, Oct. 1993, 17 pages.

Hassler et al., Measurement of Capillary Pressures in Small Core Samples, Los Angeles Meeting Oct. 1944, 10 pages.

Helland et al, Characterization of pore shapes for pore network models, Proceedings of the 11th European Conference on the Mathematics of Oil Recovery (ECMOR XI), Sep. 2008, 13 pages.

Helland et al, Computation of fluid configurations and capillary pressures in mixed-wet 2d pore spaces from rock images, Proceedings of the XVIII International Conference on Water Resources, Jun. 2010, 12 pages.

Herring et al., Flow rate impacts on capillary pressure and interface curvature of connected and disconnected fluid phases during multiphase flow in sandstone, Advances in Water Resources 107, 2017, 10 pages.

Honarpour et al, Relative-permeability measurements: An overview, SPE Technology Today Series, Aug. 1988,4 pages.

Huang et al, Water Slippage versus Contact Angle: A Quasiuniversal Relationship. Phys. Rev. Lett. 101 226101, Nov. 28, 2008, 4 pages.

Hughes et al, Network modeling of multiphase flow in fractures, Advances in Water Resources 24, 2001, 13 pages.

Hughes et al, Pore Scale Modeling of Rate Effects in Imbibition, Transport in Porous Media 40, 2000, 29 pages.

Hui et al, Effects of wettability on three-phase flow in porous media, The Journal of Physical Chemistry B 104, Feb. 17, 2000, 13 pages.

Huo et al, Experimental investigation of stress-dependency of relative permeability in rock fractures, Transp Porous Med 113, 2016, 25 pages.

Ibekwe et al, Automated extraction of in situ contact angles from micro-computed tomography images of porous media, Computers and Geosciences 137, Feb. 3, 2020, 12 pages.

Idowu, et al., Pore-Scale Modelling of Rate Effects in Waterflooding. Transport in Porous Media 83, 2010, 20 pages.

Joekar-Niasar et. al., Insights into the relationships among capillary pressure, saturation, interfacial area and relative permeability using pore-network modeling, Transp Porous Med 74, 2008, 20 pages.

Kang et al, Lattice Boltzmann pore-scale model for multicomponent reactive transport in porous media, Journal of Geophysical Research: Solid Earth 111, 2006, 12 pages.

Kang et al, Minimized Capillary End Effect During CO2 Displacement in 2-D Micromodel by Manipulating Capillary Pressure at the Outlet Boundary in Lattice Boltzmann Method, Water Resources Research 54, 2018, 21 pages.

Karpyn et. al., Visualization of fluid occupancy in a rough fracture using micro-tomography, Journal of Colloid and Interface Science 307, 2007, 7 pages.

Karpyn, et al., Prediction of fluid occupancy in fractures using network modeling and x-ray microtomography. I: Data conditioning and model description, Physical Review E 76, 016315, Jul. 31, 2007, 13 pages.

(56) References Cited

OTHER PUBLICATIONS

Karypis et al, A fast and high quality multilevel scheme for partitioning irregular graphs, Society for Industrial and Applied Mathematics Journal vol. 20 No. 1, 1998, 35 pages.
Keller et. al., Behavior of nonaqueous phase liquids in fractured porous media under two-phase flow conditions, Transport in Porous Media 38, 2000, 16 pages.
Khishvand, et al., An Improved Insight into Low-Salinity Waterflooding: In-Situ Characterization of Wettability Alteration at Elevated Pressure and Temperature Conditions, SCA2016_Temp032, Aug. 2016, 12 pages.
Khishvand, et al., In situ characterization of wettability alteration and displacement mechanisms governing recovery enhancement due to low-salinity waterflooding. Water Resources Research 53, May 31, 2017, 17 pages.
Khishvand, et al., In-situ Characterization of Wettability and Pore-scale Displacements during Two- and Three-phase flow in Natural Porous Media, Department of Petroleum Engineering, 2016, 52 pages.
Khishvand, et al., Micro-scale experimental investigation of the effect of flow rate on trapping in sandstone and carbonate rock samples. Advances in Water Resources 94, May 20, 2016, 21 pages.
Klise et. al., Automated contact angle estimation for three-dimensional x-ray microtomography data, https://www.scienedirect.com/science/article/pii/S030917815002651, 2015, 14 pages.
Kohanpur, et al., Pore-Network Stitching Method: A Pore-to-Core Upscaling Approach for Multiphase Flow. Transport in Porous Media, Oct. 27, 2020, 28 pages.
Kuang, et al., Pore-Scale Sweep Efficiency Enhancement by Silica-Based Nanofluids in Oil-Wet Sandstone, Energy Fuels 2020, 12 pages.
Lago et al, Threshold pressure in capillaries with polygonal cross section, Journal of colloid and interface science 243, 2001, 8 pages.
Lanetc et. al., Coupling of transient matrix diffusion and pore network models for gas flow in coal, Journal of Natural Gas Science and Engineering 88, 2021, 12 pages.
Laubach et. al., Are open fractures necessarily aligned with maximum horizontal stress, Earth and Planetary Science Letters 222, Feb. 17, 2004, 5 pages.
Ledig, et al., Photo-realistic single image super-resolution using a generative adversarial network., IEEE Conference on Computer Vision and Pattern Recognition, May 25, 2017, 19 pages.
Lemonnier et al, Simulation of naturally fractured reservoirs. State of the art-part 1-physical mechanisms and simulator formulation, Oil & Gas Science and Technology—Rev. IFP vol. 65, 2010, 24 pages.
Purcell, Capillary Pressures—Their Measurement Using Mercury and the Calculation of Permeability Therefrom, Shell Oil Company, Petroleum Transactions, AIME, Feb. 1949, 10 pages.
Hazlett, Simulation of capillary-dominated displacements in microtomographic images of reservoir rocks, Transport in Porous Media, 20:21-35, Aug. 1995, 15 pages.
Elrich, Viscous coupling in two-phase flow in porous media and its effect on relative permeabilities, Transport in Porous Media 11, Apr. 9, 1992, 18 pages.
Rabbani et al, Hybrid pore-network and lattice-boltzmann permeability modelling accelerated by machine learning, Advances in water resources 126, Feb. 26, 2019, 13 pages.
Rabbani, et al., An automated simple algorithm for realistic pore network extraction from micro-tomography images, J Pet Sci Eng, vol. 123, Aug. 12, 2014, 8 pages.
Raeesi et al., Capillary pressure hysteresis behavior of three sandstones measured with a multistep outflow-inflow apparatus, Vadose Zone Journal 13, Jun. 1, 2013, 12 pages.
Raeesi et al., The effects of wettability and trapping on relationships between interfacial area, capillary pressure and saturation in porous media: A pore-scale network modeling approach, Journal of Hydrology 376, 2009, 16 pages.
Raeesi, et al., Effect of surface roughness on wettability and displacement curvature in tubes of uniform cross-section. Colloids and Surfaces A: Physicochemical and Engineering Aspects 436, 2013, 10 pages.
Raeini, et al., Generalized network modeling: Network extraction as a coarse-scale discretization of the void space of porous media, Phys. Rev. E, 96 (2017), 17 pages.
Raeini, et al., Modelling two-phase flow in porous media at the pore scale using the volume-of-fluid method. Journal of Computational Physics 231, 2012, 16 pages.
Rücker et. al., Relationship between wetting and capillary pressure in a crude oil/brine/rock system: From nano-scale to core-scale, Journal of Colloid and Interface Science 562, Nov. 21, 2019, 11 pages.
Rusinkiewicz, Estimating curvatures and their derivatives on triangle meshes, Princeton University, 8 pages.
Ruspini, et al., Multiscale digital rock analysis for complex rocks. Transport in Porous Media, 139(2), Aug. 26, 2021, 26 pages.
Sabti, et al., In-situ investigation of the impact of spreading on matrix-fracture interactions during three-phase flow in fractured porous media. Advances in Water Resources 131, 2019, 15 pages.
Saraji, et al., Wettability of Supercritica ICarbon Dioxide/Water/Quartz Systems: Simultaneous measurement of Contact Angle and Interfacial Tension at Reservoir Conditions, Langmuir ACS Publications, Apr. 29, 2013, 11 pages.
Scanziani et. al., Automatic method for estimation of in situ effective contact angle from x-ray micro tomography images of two-phase flow in porous media, Journal of Colloid and Interface Science 496, 2017, 9 pages.
Sedghi, et al., Atomistic Molecular Dynamics Simulations of Crude Oil/Brine Displacement in Calcite Mesopores, Langmuir, ACS Publications, Mar. 24, 2016, 10 pages.
Sedghi, et al., Molecular dynamics of wetting layer formation and forced water invasion in angular nanopores with mixed wettability, The Journal of Chemical Physics, Nov. 19, 2014, 13 pages.
Sendner et al, Interfacial Water at Hydrophobic and Hydrophilic Surfaces: Slip, Viscosity, and Diffusion. Langmuir 25, 10768-10781, Jun. 11, 2009, 14 pages.
Shabat et al., Design of porous micro-structures using curvature analysis for additive-manufacturing, Eslevier, Procedia CIRP 36, 2015, 6 pages.
Sheng, et al., A unified pore-network algorithm for dynamic two-phase flow, Advances in Water Resources 95, 2016, 17 pages.
Shi et al, Relative permeability of two-phase flow in three-dimensional porous media using the lattice Boltzmann method, International Journal of Heat and Fluid Flow 73, Aug. 4, 2018, 13 pages.
Silin et al., Pore space morphology analysis using maximal inscribed spheres, Physica A, May 16, 2006, 25 pages.
Singh et al, Dynamic modeling of drainage through three-dimensional porous materials, Chemical Engineering Science 58, Apr. 2003, 18 pages.
Siqveland et al, Derivations of the young-laplace equation, Capillarity vol. 4 No. 2, 2021, 8 pages.
Spanne et al, Synchrotron computed microtomography of porous media: topology and transports, Physical Review Letters, Oct. 3, 1994, 16 pages.
Suicmez, et al, Effects of wettability and pore-level displacement on hydrocarbon trapping, Advances in Water Resources, Nov. 19, 2007, 10 pages.
Suicmez, et al., Pore-scale Simulation of Water Alternate Gas Injection, Transport in Porous Media 66:259-286, Springer, 31, Jan. 2006, 28 pages.
Lee et al, Building skeleton models via 3-d medial surface axis thinning algorithms, CVGIP: Graphical Models and Image Processing, 56, Nov. 1994, 17 pages.
Tan et al. Equation-of-State Modeling of Associating-Fluid Phase Equilibria in Nanopores, Fluid Phase Equilibria 405, 2015, 10 pages.
Tan et al., Equation-of-State Modeling of Confined-Fluid Phase Equilibria in Nanopores, Fluid Phase Equilibria 393, 2015, 16 pages.

(56) References Cited

OTHER PUBLICATIONS

Thompson, Pore-scale modeling of fluid transport in disordered fibrous materials, AIChE Journal, Jul. 2002, vol. 48, No. 7, 21 pages.
Tokunaga et al, Water film flow along fracture surfaces of porous rock, Water Resources Research vol. 33 No. 6, Jun. 1997, 9 pages.
Tokunaga et. al., Transient film flow on rough fracture surfaces, Water Resources Research vol. 36 No. 7, Jun. 2000, 10 pages.
Tørå et al., A Dynamic Network Model for Two-Phase Flow in Porous Media. Transp Porous Med 92, 2012, 21 pages.
Tsang, et. al., Hydrologic issues associated with nuclear waste repositories, Water Resources Research 51, 2015, 50 pages.
Valvatne, et al., Predictive pore-scale modeling of two-phase flow in mixed wet media. Water Resources Research 40, 2004, 21 pages.
Van Genuchten, A closed-form equation for predicting the hydraulic conductivity of unsaturated soils, Soil Sci. Soc. Am. J. vol. 44, 1980, 7 pages.
Van Gorp et al, Bottom-up design of porous electrode by combining a genetic algorithm and a pore network model, Chemical Engineering Journal 455, 2023 13 pages.
Virnovsky, et al., Modeling capillary pressure using capillary bundles with arbitrary cross-sections obtained from photomicrographs. Journal of Petroleum Science and Engineering 69, 2009, 12 pages.
Vouga, Lectures In Discrete Differential Geometry 3-Discrete Surfaces, Mar. 19, 2014, 6 pages.
Wang et al., Connecting pressure-saturation and relative permeability models to fracture properties: The case of capillary-dominated flow of supercritical CO2 and brine, Water Resources Research, Sep. 27, 2018, 18 pages.
Wang et. al., Experimental study of the nonlinear flow characteristics of fluid in 3d rough-walled fractures during shear process, Rock Mechanics and Rock Engineering, Feb. 25, 2020, 25 pages.
Wang, et al., A dynamic pore-scale network model for two-phase imbibition, Journal of Natural Gas Science and Engineering 26, 2015, 12 pages.
Wang, et al., Deep learning in pore scale imaging and modeling. Earth-Science Reviews, 215, 2021, 32 pages.
Wang, et al., Fast direct flow simulation in porous media by coupling with pore network and Laplace models. Advances in Water Resources 150, 103883, 2021, 13 pages.
Watanabe et. al., New v-type relative permeability curves for two-phase flows through subsurface fractures, Water Resources Research, Apr. 26, 2015, 18 pages.
Welch et al., Molecular Dynamics Simulations of Retrograde Condensation in Narrow Oil-Wet Nanopores, The Journal of Physical Chemistry, 2015, 8 pages.
Welch et al., Pore diameter effects on phase behavior of a gas condensate in graphitic one- and two-dimensional nanopores, J Mol Model, 2016, 9 pages.
Wildenschild, et al., X-ray imaging and analysis techniques for quantifying pore-scale structure and processes in subsurface porous medium systems, Advanced Water Resources, vol. 51, Jan. 2013, 75 pages.
Leverett, et al., Capillary Behavior in Porous Solids, manuscript, Oct. 1940, 18 pages.
Li et. al., An improved method for estimating capillary pressure from 3d microtomography images and its application to the study of disconnected nonwetting phase, Science Direct, 2018, 33 pages.
Lian et. al., The characteristics of relative permeability curves in naturally fractured carbonate reservoirs, Journal of Canadian Petroleum Technology, Mar. 2012, 6 pages.
Liang, et al., Geometric and topological analysis of three-dimensional porous media: Pore space partitioning based on morphological skeletonization, Journal of Colloid and Interface Science, 221, 2000, 12 pages.
Lim et al., Enhanced deep residual networks for single image super-resolution, In Proceedings of the IEEE conference on computer vision and pattern recognition workshops, Jul. 10, 2017, 9 pages.
Lin et al., Imaging and measurement of pore-scale interfacial curvature to determine capillary pressure simultaneously with relative permeability, Water Resources Research 54, Sep. 8, 2018, 15 pages.
Lin et. al., Minimal surfaces in porous media: Pore-scale imaging of multiphase flow in an altered-wettability Bentheimer sandstone, Physical Review E 99, Jun. 10, 2019, 13 pages.
Lindquist et al., Investigating 3D geometry of porous media from high resolution images, Physics and Chemistry of the Earth, MS No. SE39.2012, 1998, 8 pages.
Lindquist, et al., Medial Axis Analysis of Three Dimensional Tomographic Images of Drill Core Samples, Jan. 27, 1995, 19 pages.
Lindquist, The geometry of primary drainage, Journal of colloid and interface science 296, Nov. 16, 2005, 14 pages.
López, Constant mean curvature surfaces with boundary, Springer Monographs in Mathematics, 2013, 296 pages.
Lorensen et al., Marching cubes: A high resolution 3d surface construction algorithm, Computer Graphics, vol. 21, No. 4, Jul. 1987, 8 pages.
Lv et. al., In situ local contact angle measurement in a CO2-brine-sand system using microfocused x-ray CT, Research Gate, Jan. 19, 2018, 10 pages.
Heshmati et al, Experimental investigation of dynamic contact angle and capillary rise in tubes with circular and noncircular cross sections, Langmuir, Oct. 16, 2014, 12 pages.
Ma, et al., Effect of contact angle on drainage and imbibition in regular polygonal tubes, Colloids and Surfaces A: Physicochemical and Engineering Aspects 117, 1996, 19 pages.
Maini et. al., A comparison of steady-state and unsteady-state relative permeabilities of viscocities oil and water in Ottawa sand, The Journal of Canadian Petroleum Technology, Mar.-Apr. 1990, 7 pages.
March et. al., Assessment of CO2 storage potential in naturally fractured reservoirs with dual-porosity models, Water Resources Research 54, Mar. 8, 2018, 20 pages.
Mascini, et al., Event-based contact angle measurements inside porous media using time-resolved micro-computed tomography, Journal of Colloid and Interface Science 572, 2020, 10 pages.
Mason et al., Capillary behavior of a perfectly wetting liquid in irregular triangular tubes, Journal of Colloid and Interface Science, vol. 141, No. 1, Jan. 1991, 13 pages.
Masson, A fast two-step algorithm for invasion percolation with trapping, Computers & Geosciences 90, Feb. 3, 2016, 9 pages.
Mayer et al., Mercury porosimetry—breakthrough pressure for penetration between packed spheres, Journal of Colloid Science 20, Mar. 4, 1965, 19 pages.
Miao et al., A new way to parameterize hydraulic conductances of pore elements: A step towards creating pore-networks without pore shape simplifications, Advances in water resources 105, Apr. 26, 2017, 11 pages.
Mirani et. al., Production-pressure-drawdown management for fractured horizontal wells in shale-gas formations, SPE Reservoir Evaluation & Engineering, Aug. 2018, 16 pages.
Mohamed, et al., A pore-scale experimental investigation of process-dependent capillary desaturation, Advances in Water Resources 114, 2020, 13 pages.
Neuweiler et. al., Experimental and theoretical investigations of drainage in horizontal rough-walled fractures with different correlation structures, Advances in Water Resources 27, Jul. 14, 2004, 15 pages.
Nguyen et. al., Effectiveness of supercritical-CO2 and N2 huff-and-puff methods of enhanced oil recovery in shale fracture networks using microfluidic experiments, Science Direct, 2018, 39 pages.
Oak, Three-Phase Relative Permeability of Water-Wet Berea, SPE/DOE 20183, Apr. 25, 1990, 12 pages.
Ogilvie et. al., Fluid flow through rough fractures in rocks. II: A new matching model for rough rock fractures, Earth and Planetary Science Letters 241, Jan. 4, 2006, 12 pages.
Øren et al, Extending predictive capabilities to network models, SPE journal 3, Jun. 15, 1996, 18 pages.

(56) References Cited

OTHER PUBLICATIONS

Øren et al, Reconstruction of Berea sandstone and pore-scale modelling of wettability effects, J Pet Sci Eng, vol. 39, No. 3-4, Jan. 24, 2003, 24 pages.
Ovaysi et al., Multi-GPU acceleration of direct pore-scale modeling of fluid flow in natural porous media, Computer Physics Communications, Apr. 25, 2012, 9 pages.
Ovaysi et al., Pore-scale dissolution of CO2+SO2 in deep saline aquifers, International Journal of Greenhouse Gas Control, Mar. 18, 2013, 15 pages.
Ovaysi et al., Pore-space alteration induced by brine acidification in subsurface geologic formations, Water Resources Research, vol. 50, 440-452, Jan. 17, 2014.
Ovaysi, et al., Direct pore-level modeling of incompressible fluid flow in porous media, Journal of Computational Physics, Jun. 23, 2010, 21 pages.
Ovaysi, et al., Pore-scale modeling of dispersion in disordered porous media, Journal of Contaminant Hydrology, Feb. 15, 2011, 14 pages.
Patzek, Verification of a Complete Pore Network Simulator of Drainage and Imbibition, SPE J. 6, Jan. 10, 2001, 13 pages.
Persoff et al, Two-phase flow visualization and relative permeability measurement in natural rough-walled rock fractures, Water Resources Research vol. 31, May 1995, 12 pages.
Petchsingto, Numerical study of fracture aperture characteristics and their impact on single-phase flow and capillary-dominated displacement, The Pennsylvania State University College of Earth and Mineral Sciences, May 2008, 153 pages.
Piri et al, Prediction of fluid occupancy in fractures using network modeling and x-ray microtomography. II: Results, Physical Review E 76, 2007, 11 pages.
Piri et al, Three-phase threshold capillary pressures in noncircular capillary tubes with different wettabilities including contact angle hysteresis, Physical Review E 70, Dec. 14, 2004, 17 pages.
Piri et al., “Three-dimensional mixed-wet random pore-scale network modeling of two- and three-phase flow in porous media. I. Model description”, Physical Review E 71, 026301, 2005, 30 pages.
Piri, et al., Three-dimensional mixed-wet random pore-scale network modeling of two- and three-phase flow in porous media. II. Results, Physical Review E 71, 026301, Feb. 4, 2005, 11 pages.
Princen, Capillary Phenomena in Assemblies of Parallel Cylinders: I. Capillary Rise Between Two Cylinders, Journal of Colloid and Interface Science, 30, 1969, 7 pages.
Princen, Capillary Phenomena in Assemblies of Parallel Cylinders: II. Capillary Rise in Systems With More Than Two Cylinders. Journal of Colloid and Interface Science, 30, 1969, 13 pages.
Princen, Capillary Phenomena in Assemblies of Parallel Cylinders: III. Liquid Columns Between Horizontal Parallel Cylinders. Journal of Colloid and Interface Science, 34, 1970, 14 pages.
Prodanovic et al., A level set method for determining critical curvatures for drainage and imbibition, Elsevier, Journal of Colloid and Interface Science 304, Aug. 23, 2006, 17 pages.
Prodanovic et al., Porous structure and fluid partitioning in polyethylene cores from 3D x-ray microtomographic imaging, Journal of Colloid and Interface Science, 298 (2006), 16 pages.
Prodanovic, et al., 3d image-based characterization of fluid displacement in a berea core. Advances in Water Resources, 30, 2007, 13 pages.
Prodanovic, et al., Imaged-based multiscale network modelling of microporosity in carbonates, Geological Society, 406 (2015), 19 pages.
Pruess, et al., On two-phase relative permeability and capillary pressure of rough-walled rock fractures, Earth Sciences Division, Sep. 1989, 44 pages.
Adler, Transports in fractal porous media, Journal of Hydrology, 187 (1996), 19 pages.
Aghaei, et al., Direct pore-to-core up-scaling of displacement processes: Dynamic pore network modeling and experimentation, Journal of Hydrology 522 2015, 22 pages.
Akai et. al., Quantification of uncertainty and best practice in computing interfacial curvature from complex pore space images, Dept of Earth Sci. & Eng, Jul. 3, 2019, 21 pages.
Aker, et al., A Two-Dimensional Network Simulator for Two-Phase Flow in Porous Media, Transport in Porous Media 32, 1998, pp. 163-186.
Al-Gharbi, et al., Dynamic network modeling of two-phase drainage in porous media. Phys. Rev. E 71, 16308, Jan. 13, 2005, 16 pages.
Alhammadi et. al., Pore-scale x-ray imaging with measurement of relative permeability, capillary pressure and oil recovery in a mixed-wet micro-porous carbonate reservoir rock, Fuel 268, Feb. 29, 2020, 14 pages.
Alizadeh, et al., The effect of saturation history on three-phaserelative permeability: An experimental study, Department of Chemical and Petroleum Eng, University of Wyoming, Jan. 31, 2014, 29 pages.
Al-Raoush et al., Extraction of physically realistic pore network properties from three-dimensional synchrotron x-ray microtomography images of unconsolidated porous media systems, Journal of Hydrology, 300, 2005, 173 pages.
AlRatrout et al., Automatic measurement of contact angle in pore-space images, Advances in Water Resources 109, 2017, 12 pages.
Álvaro González, Measurement of areas on a sphere using fibonacci and latitude-longitude lattices. Mathematical Geosciences, 42, 28, Nov. 2009, 17 pages.
An, et al., Transition From Viscous Fingering to Capillary Fingering: Application of GPU-Based Fully Implicit Dynamic Pore Network Modeling, Water Resources Research 56, Oct. 22, 2020, 18 pages.
Anbari et al., Estimation of capillary pressure in unconventional reservoirs using thermodynamic analysis of pore images. JGR: Solid Earth, Nov. 7, 2019, 23 pages.
Anderson, W. G. Wettability Literature Survey—Part 6: The Effects of Wettability on Waterflooding, Journal of Petroleum Technology, Dec. 1987, 18 pages.
Anderson, Wettability Literature Survey—Part 2: Wettability Measurement, Journal of Petroleum Technology, Nov. 1986, 17 pages.
Anderson, Wettability Literature Survey Part 5: The Effects of Wettability on Relative Permeability, Journal of Petroleum Technology, Nov. 1987, 16 pages.
Andrã et al., Digital rock physics benchmarks—part i: Imaging and segmentation, Computers & Geosciences, 50, Sep. 18, 2012, 8 pages.
Andrew, et al., Pore-scale contact angle measurements at reservoir conditions using X-ray microtomography, Advances in Water Resources 68, 2014, 8 pages.
Armstrong, et al., Linking pore-scale interfacial curvature to column scale capillary pressure, Advances in Water Resources 46, 2012, 8 pages.
Arshadi et. al., Pore-Scale Experimental Investigation of Two-Phase Flow Through Fractured Porous Media, Advancing Earth and Space Science, May 20, 2018, 30 pages.
Ayodele, Theoretical analysis of viscous coupling in two-phase flow through porous media, Transport in Porous Media, 2006, 14 pages.
Bakhshian, et al., Pore-scale characteristics of multiphase flow in heterogeneous porous media using the lattice Boltzmann method, Scientific Reports 9 Mar. 4, 2019, 14 pages.
Balay et al, PETSc Users Manual, Technical Report ANL-95/11 Revision 3.11, Argonne National Laboratory, 2019, 268 pages.
Bear, Modeling Flow and Contaminant Transport in Fractured Rocks, Technion-Israel Institute of Technology, 1993, 37 pages.
Berg et. al., Real-time 3D imaging of Haines jumps in porous media flow, Harvard University, Jan. 17, 2023, 5 pages.
Bertels et. al., Measurement of aperture distribution, capillary pressure, relative permeability, and in situ saturation in a rock fracture using computed tomography scanning, Water Resources Research, vol. 37, No. 3, Mar. 2001, 14 pages.
Bhattad et al, Effect of network structure on characterization and flow modeling using x-ray micro-tomography images of granular and fibrous porous media, Transport in Porous Media 90, 2011, 30 pages.

(56) References Cited

OTHER PUBLICATIONS

Blunt et. al., A thermodynamically consistent characterization of wettability in porous media using high-resolution imaging, Journal of Colloid and Interface Science 552, 2019, 7 pages.
Blunt, Effects of heterogeneity and wetting on relative permeability using pore level modeling, SPE Journal, vol. 2, Mar. 1997, 18 pages.
Blunt, et al., Pore-scale imaging and modelling, Advances in Water Resources, 51, 2013, https://doi.org/10.1016/j.advwatres.2012.03.003, 20 pages.
Blunt, Physically-based network modeling of multiphase flow in intermediate-wet porous media. Journal of Petroleum Science and Engineering 20, Jan. 21, 1998, 9 pages.
Blunt, et al., Detailed physics, predictive capabilities and macroscopic consequences for pore-network models of multiphase flow, Advances in Water Resources, 25 (2002), 21 pages.
Brown, Fluid flow through rock joints: The effect of surface roughness, Journal of Geophysical Research, vol. 92, No. B2, Feb. 10, 1987, 11 pages.
Brown, Simple mathematical model of a rough fracture, Journal of Geophysical Research, vol. 100, No. B4, Apr. 10, 1995, 12 pages.
Brush et al., Fluid flow in synthetic rough-walled fractures: Navier-stokes, stokes, and local cubic law simulations, Water Resources Research, vol. 39, No. 4, 1085, Apr. 3, 2023, 15 pages.
Bryant, et al., Prediction of relative permeability in simple porous media, Phys. Rev. A, vol. 46, No. 4, Aug. 15, 1992, 8 pages.
Bultreys et al, Validation of model predictions of pore-scale fluid distributions during two-phase flow, Phys. Rev. E, 97, May 14, 2018, 14 pages.
Chen, Liquid-gas relative permeabilities in fractures: Effects of flow structures, phase transformation and surface roughness, Dissertation, Jun. 2005, 222 pages.
Corey, et. al., Three-Phase Relative Permeability, Gulf Research & Development Co., Nov. 1956, 3 pages.
Culligan et. al., Interfacial area measurements for unsaturated flow through a porous medium, Water Resources Research, vol. 40, W12413, Dec. 22, 2004, 12 pages.
Culligan et. al., Pore-scale characteristics of multiphase flow in porous media: A comparison of air-water and oil-water experiments, Advances in Water Resources 29, 2006, 12 pages.
David et. al., Investigation of the Neumann triangle for dodecane liquid lenses on waters, Colloids and Surfaces A: Physicochemical and Engineering Aspects, 333, 2009, 7 pages.
Desbrun et. al., Implicit fairing of irregular meshes using diffusion and curvature flow, Siggraph 99, 1999, 8 pages.
Detwiler et. al., Interphase mass transfer in variable aperture fractures: Controlling parameters and proposed constitutive relationships, Water Resources Research, vol. 45, Aug. 27, 2009, 21 pages.
Diomampo, Relative permeability through fractures, SGP-TR-170, Aug. 2001, 74 pages.
Dong, et al., Pore-network extraction from micro-computerized-tomography images, Phys. Rev. E 80, 036307, Sep. 14, 2009, 11 pages.
Dong, Micro-CT Imaging and Pore Network Extraction, Dissertation to Dept. of Earth Science and Engineering of Imperial College London, 2007, 30 pages.
Ehrlich, Viscous Coupling in Two-Phase Flow in Porous Media and Its Effect on Realtive Permeabilities, Transport in Porous Media, 11, 1993, 18 pages.
Fatt, The Network Model of Porous Media. AIME Petroleum Transactions, 1956, 38 pages.
Fei, Avizo Reference Guide, Avizo Software for Materials Research, ThermoFisher, 12 pages.
Ferer et. al., Two-phase flow in a rough fracture: Experiment and modeling, Physical Review E84, Jul. 28, 2011, 8 pages.
Xie, et al., Impact of connate brine chemistry on in situ wettability and oil recovery: Pore-scale experimental investigation, Energy &fuels, 2020, 15 pages.
Xiong, et al., Review of pore network modelling of porous media: Experimental characterisations, network constructions and applications to reactive transport. Journal of Contaminant Hydrology 192, Jul. 12, 2016, 17 pages.
Yan et. al., Foam sweep in fractures for enhanced oil recovery, Colloids and Surfaces A: Physicochem Eng. Aspects, Feb. 24, 2006, 12 pages.
Yang et al, An automatic in situ contact angle determination based on level set method, Water Resources Research, May 29, 2020, 14 pages.
Yang et. al., A generalized approach for estimation of in-plane curvature in invasion percolation models for drainage in fractures, Water Resources Research, vol. 48, Sep. 6, 2012, 12 pages.
Yang et. al., Effect of aperture field anisotropy on two-phase flow in rough fractures, Advances in Water Resources 132, 2019, 11 pages.
Yang et. al., Modeling immiscible two-phase flow in rough fractures from capillary to viscous fingering, Water Resources Research, 2019, 24 pages.
Ye et. al., Two-phase flow properties of a horizontal fracture: The effect of aperture distribution, Advances in Water Resources 76, 2015, 12 pages.
Yeo et. al., Effect of shear displacement on the aperture and permeability of a rock fracture, Int. J. Rock Mech. Min. Sci. vol. 35, 1998, 20 pages.
Yi, et al., Pore network extraction from pore space images of various porous media systems, Water Resources Research, Apr. 26, 2017, 22 pages.
Young, III. An essay on the cohesion of fluids, https://royalsocietypublishing. org, Dec. 20, 1804, 23 pages.
Zankoor et al., In-Situ Capillary Pressure and Wettability in Natural Porous Media: Multi-Scale Experimentation and Automated Characterization Using X-Ray Images, Journal of Colloid and Interface Science 603, Jun. 15, 2021, 14 pages.
Zankoor et. al., Supplementary Information: In-Situ Capillary Pressure and Wettability in Natural Porous Media: Multi-Scale Experimentation and Automated Characterization Using X-Ray Images, Journal of Colloid and Interface Science 603, Jun. 15, 2021, 14 pages.
Zhao, et al., Comprehensive comparison of pore-scale models for multiphase flow in porous media, Proceedings of the National Academy of Sciences vol. 116, No. 28, Jun. 21, 2019, 8 pages.
Zhao, et al., Simulation of Quasi-Static Drainage Displacement in Porous Media on Pore-Scale: Coupling Lattice Boltzmann Method and Pore Network Model. Journal of Hydrology 588, May 23, 2020, 16 pages.
Zhao, et al., The Effect of Wettability Heterogeneity on Relative Permeability of Twophase Flow in Porous Media: A Lattice Boltzmann Study. Water Resources Research 54, Feb. 27, 2018, 17 pages.
Zhou, et al., Computation of three-phase capillary entry pressures and arc menisci configurations in pore geometries from 2d rock images: a combinatorial approach. Advances in Water Resources 69, Apr. 2, 2014, 16 pages.
Zhou, et al., Dynamic capillary pressure curves from pore-scale modeling in mixed-wet-rock images. SPE Journal Aug. 2013, 12 pages.
Zhou, et al., On the Estimation of CO2 Capillary Entry Pressure: Implications on Geological CO2 Storage. International Journal of Greenhouse Gas Control, 20 pages.
Zhu, et al., Limits of the Hydrodynamic No-Slip Boundary Condition. Physical Review Letters, vol. 88, No. 10, Mar. 11, 2002, 4 pages.
Zolfaghari et al., Pore-Scale Network Modeling of Three-Phase Flow Based on Thermodynamically Consistent Threshold Capillary Pressures. I. Cusp Formation and Collapse, Transport in Porous Media, 2017, 46 pages.
Zolfaghari, et al., Pore-scale Network Modeling of Three-Phase Flow Based on Thermodynamically Consistent Threshold Capillary Pressures. I. Cusp Formation and Collapse Transport in Porous Media, Jan. 21, 2017, 46 pages.
Zolfaghari, et al., Pore-scale Network Modeling of Three-Phase Flow Based on Thermodynamically Consistent Threshold Capillary Pressures. II. Results Transport in Porous Media 116:1139-1165, Jan. 21, 2017, 27 pages.

(56) References Cited

OTHER PUBLICATIONS

Schroeder, et al., The Visualization Toolkit, an Object-Oriented Approach to 3D Graphics, Edition 4.1, VTK, Jul. 2018, 558 pages.
PCT/US2023/31400, International Search Report and Written Opinion dated Jan. 31, 2024, 26 pages.
PCT/US2023/31329, International Search Report and Written Opinion dated Nov. 21, 2023, 13 pages.
PCT/US2023/31338, International Search Report and Written Opinion dated Mar. 18, 2024, 22 pages.
PCT/US2024/26432, International Search Report and Written Opinion dated Aug. 22, 2024, 17 pages.
PCT/US2024/44240, International Search Report and Written Opinion dated Nov. 4, 2024, 17 pages.
Brooks et al., Hydraulic Properties of Porous Media, Hydrology Papers, Mar. 1964, 37 pages.

* cited by examiner

304

302

Read in and process images

304

Initial overlap distance estimation

Generation of lens regions

Rotation of images to a common axis

Reduction of search area

Initial alignment of images

Update overlap distance {x, y}

Rotation of images back to initial position

No

SI > tol

Compute similarity index

Yes

306

Volumetric image stitiching

700

1000

1200

METHODS AND DEVICES FOR ENHANCEMENT OF POROUS MEDIA IMAGES

CROSS-REFERENCE TO RELATED APPLICATIONS

This applications claims benefit of U.S. Provisional Patent Application No. 63/401,990, filed Aug. 29, 2022, the entirety of which is herein incorporated by reference.

BACKGROUND

Field

Aspects of the present disclosure generally relate to imaging of porous media, and more particularly, to high-resolution imaging for porous media samples.

Description of the Related Art

Modeling techniques for fluid flow through porous media are broadly implemented for petroleum resource development, materials engineering, food packaging, and medical technology development. Fluid flow modeling techniques may be equipped to illustrate both physical and chemical media properties like permeability, capillary pressure, fluid saturation, contact angle, wettability, or other similar properties, which may be used to characterize fluid behavior.

Although current techniques for modelling fluid flow through porous media are based on technological advancements made over many years, resultant models may still be tenuous representations of actual porous media. For example, fluid flow models of porous media exceeding a few millimeters may require a lower resolution implementation to match currently available computational capabilities. As a result, fluid flow models based on porous media of a larger scale may not accurately reflect physical and chemical properties of the media. Accordingly, there is an impetus to improve the accuracy of fluid flow modeling, including, for example: improving image processing techniques to allow for higher resolution model input and model output, improving image processing techniques to allow for more accurate model input and model output, enhancing computational processing capability to reduce computational expense, enhancing computational processing capability increase modeling speed, increasing automation for iterative modeling steps, improving model capability for dynamic modeling of different fluid flow environments, improving model capability for dynamic modeling of larger fluid flow environments, and the like.

Consequently, there exists a need for further improvements in fluid flow modeling of porous media to overcome the aforementioned technical challenges and other challenges not mentioned.

SUMMARY

One aspect of the present disclosure provides a method for image processing by one or more central processing units (CPU). The method may include detecting an overlap pattern for a set of slice images of a porous media sample. The method may include, based on the overlap pattern, determining a set of overlap distances for the set of slice images of the porous media sample. The method may include registering, based on at least the set of overlap distances, a composite image comprising any of the set of slice images of the porous media sample.

One aspect provides a method for image processing by one or more graphics processing units (GPU). The method may include obtaining, from one or more CPUs, a composite image based at least in part on a set of overlap distances for a set of slice images of a porous media sample. The method may include determining pixel values for each pixel of the composite image. The method may include, based on the pixel values, generating a blended image corresponding to the set of slice images of the porous media sample.

One aspect provides an apparatus for predicting dynamic two-phase fluid flow in a water-wet porous medium comprising a memory and one or more CPUs, the one or more CPUs configured to cause the apparatus to perform a method of image processing. The method of image processing includes detecting an overlap pattern for a set of slice images of a porous media sample based on the overlap pattern. The method of image processing includes determining a set of overlap distances for the set of slice images of the porous media sample. The method of image processing includes registering, based on at least the set of overlap distances, a composite image comprising any of the set of slice images of the porous media sample.

One aspect provides an apparatus for predicting dynamic two-phase fluid flow in a water-wet porous medium comprising a memory and one or more GPUs, the one or more GPUs configured to cause the apparatus to perform a method of image processing. The method of image processing includes obtaining, from one or more CPUs, a composite image based at least in part on a set of overlap distances for a set of slice images of a porous media sample. The method of imaging includes determining pixel values for each pixel of the composite image. The method of imaging includes based on the pixel values, generating a blended image corresponding to the set of slice images of the porous media sample.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more message passing interfaces.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only example aspects and are therefore not to be considered limiting of its scope, may admit to other equally effective aspects.

To facilitate understanding, identical reference numerals have been used, where possible, to designate identical elements that are common to the figures. It is contemplated that elements and features of one aspect may be beneficially incorporated in other aspects without further recitation.

DETAILED DESCRIPTION

Figure 1A:
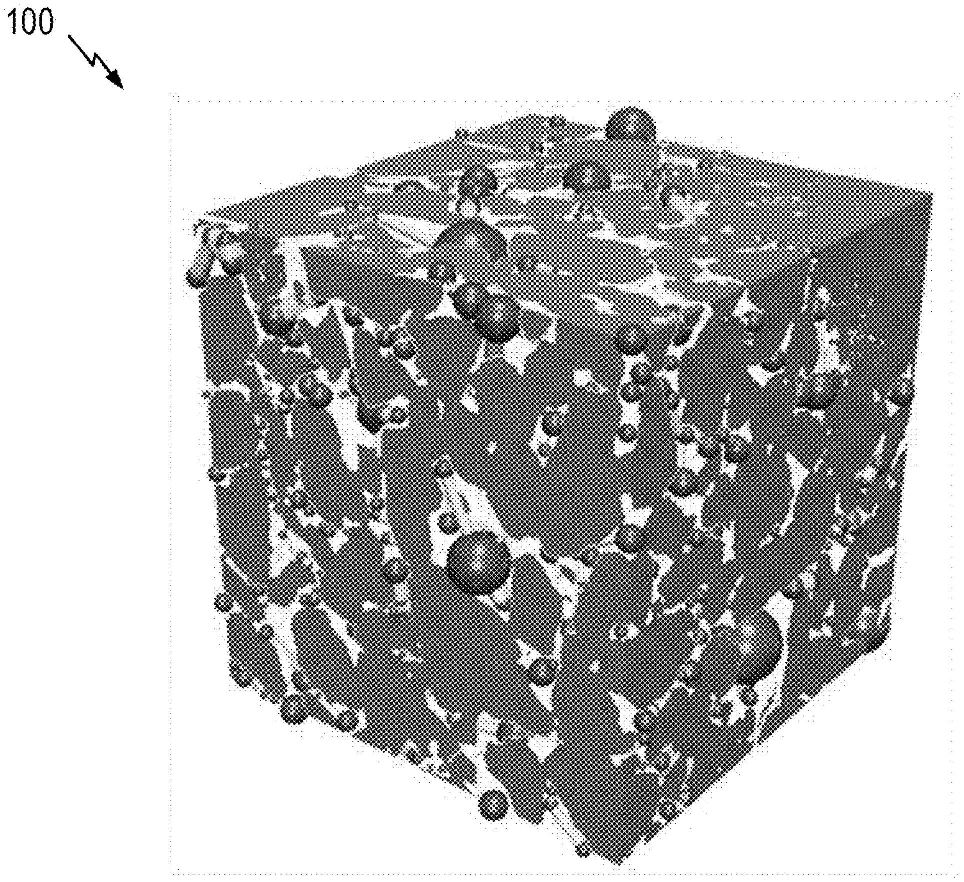
FIG. 1A example pore network representation overlaid with a segmented micro-CT image.

In the following, reference is made to aspects of the disclosure. However, it should be understood that the disclosure is not limited to specifically aspects described. Instead, any combination of the following features and elements, whether related to different aspects or not, is contemplated to implement and practice the disclosure. Furthermore, although aspects of the disclosure may achieve advantages over other possible solutions and/or over the prior art, whether or not a particular advantage is achieved by a given aspect is not limiting of the disclosure. Thus, the following aspects, features, aspects, and advantages are merely illustrative and are not considered elements or limitations of the appended claims except where explicitly recited in a claim(s). Likewise, a reference to "the disclosure" shall not be construed as a generalization of any inventive subject matter disclosed herein and shall not be considered to be an element or limitation of the appended claims except where explicitly recited in a claim(s).

The present disclosure relates to techniques for high-resolution imaging of porous media. Specifically, the techniques discussed herein may be implemented for use in generating and enhancing accurate, high-resolution images of porous media. The porous media may comprise a rock sample, a core sample, a fracture sample, a plastic sample, a tissue sample, or any other organic or inorganic sample having pore space ascertainable through imaging techniques described herein.

A thorough grasp of fluid flow through porous spaces of certain materials may be consequential to enhancing technical efficacy of fluid flow techniques in a wide range of industries. Models of fluid flow are useful to describe physical and chemical characteristic of a porous material and may help to highlight the material's optimal usage. Often, networks of pores within a material are extremely small, ranging from microscale to microscale in size. Techniques for characterizing these pore networks are hindered by the computational expense of modeling at a microscale. To alleviate computational burdens, pore network modelling techniques often use generalized characterization techniques at expense of model accuracy. Extrapolation errors caused by such imprecise characterization may result in mischaracterization of physical and chemical characteristics of the porous material. In many cases, these errors render such models impractical for regular use. Accordingly, ideal modeling of fluid flow through porous media would allow for rapid, accurate characterization of microscale pore spaces that may be performed without inhibitive computational expense.

According to certain aspects of the present disclosure, high-resolution imaging of porous material may be achieved through multi-image analysis performed by processing systems operating in parallel. Specifically, overlapping high-resolution images of a porous material, may be obtained by a scanning instrument (e.g., a micro-computed tomography (CT) scanner), stitched together where the images overlap, and processed to obtain a super-resolution image of the porous material. Stitching procedures may be split across one or more central processing units (CPUs) and/or one or more graphics processing units (GPUs) in a parallel processing architecture. This may allow faster, more accurate modeling of porosity information without loss of vital micro-porosity detail.

Implementation of techniques for efficiently generating high-resolution images as described herein may enhance pore network modelling functionality. Specifically, techniques described herein may reduce porous material characterization errors to the benefit of all users seeking a more comprehensive understanding of any given porous material.

Introduction to Pore Network Modeling

Modeling techniques for fluid flow through porous media may illustrate both physical and chemical porous media properties. Models of porous media may be used to ascertain permeability, capillary pressure, fluid saturation, wettability, buoyancy, and the like to a greater degree of accuracy more comparable to physical flooding of a porous media sample. Additionally, physical and chemical properties determined using pore network modeling techniques may be used to characterize in-situ fluid behavior as it travels through the porous media under a wide variety of wettability and flooding conditions. These conditions may not be accessible to users performing conventional physical flooding characterization techniques.

Permeability is the tendency of the porous media to allow liquids to flow through it. Capillary pressure is the pressure difference existing across the interface separating two immiscible fluids. Fluid saturation is the measurement of fluid present in the pore spaces of the porous media. Contact angle is a measured angle between a fluid-fluid or a fluid-gas interface at a point where it meets a solid surface. Wettability is the ability of a liquid to maintain contact with a solid surface. Wettability may vary depending on wettability conditions and the type of wetting liquid present in the porous media sample. For example, a water-wet medium may show a lower wetting affinity to the oil phase than an oil-wet medium, where higher or lower wetting is determined with respect to a given phase. In certain cases, the correlation between wettability and viscosity ratio may not be straightforward, as there may be water or oil wet conditions with similar viscosities.

A modeled pore network is a practical description of a porous medium targeted for fluid flow modeling. FIG. 1A illustrates an example section of a pore network extracted from porous sandstone. The section of the pore network describes the porosities of various size and shape present in that portion of the sandstone, and may be used to model fluid flow through those porosities for various wettability conditions. Three-dimensional (3D) portions of a pore network model may more accurately characterize the porous media sample either alone or in combination with other 3D portions of the pore network model.

Pore network models (e.g., of FIG. 1A) may be extracted from images of a targeted porous medium and used to model multi-phase fluid flow using physically-based displacement mechanisms (PBDMs) across pores defined in a pore network. PBDMs may represent an estimated displacement of a modeled fluid in response to movement of another fluid or gas within the pore network. As immiscible phases react with one another throughout the pore network during fluid flooding, PBDMs are induced where, for example, capillary pressure across a meniscus exceeds the wettability constraints on either phase. Fluid saturation, contact angle, buoyancy, and the like may also affect PBDMs throughout a pore network. By utilizing a pore network model extracted from a porous media sample, a user may be able to ascertain PBDMs through the porous media sample under a wide variety of wettability conditions in order to ultimately obtain, for example, useful permeabilities for a larger sample of the porous medium without degrading a porous media sample via repeated physical flooding.

Figure 1B:
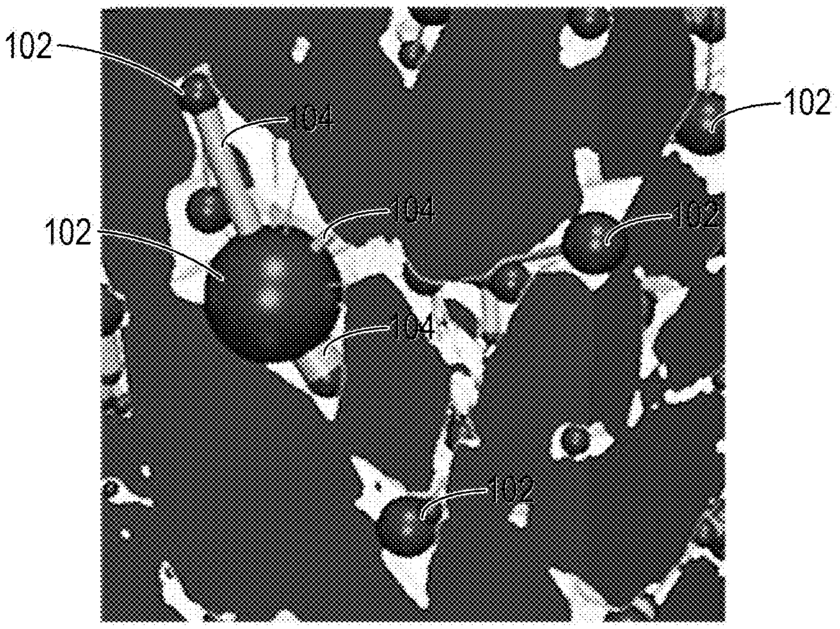
FIG. 1B depicts example high-resolution porous media images taken by a scanning instrument from a single rock sample and segmented for characterization.

To properly generate PBDMs at a pore scale for the targeted porous media, imaging may capture complex geometries of the targeted porous media at a resolution sufficiently high to retain acceptable accuracy. An example of these geometries is illustrated in FIG. 1B. Pores may be defined as a complex polyhedron having at least a center 102 and spherical and effective diameters. Connective throats 104 between pores may also be defined. In many cases, image resolution may be in micrometers to capture applicable pore detail. High-resolution pore models allow for accurate rendering of the fluid flow characteristics described above as ascertained at each pore and for each PBDM.

PBDMs may occur upon flooding or draining of a pore network model, where aqueous phase injection or removal is iteratively simulated through the pore network. Aqueous flooding and aqueous draining may be implemented in various modeled wettability conditions, where certain fluids are present prior to the start of a simulation. Wettability conditions may include at least water-wet, oil-wet, or mixed-wet conditions. During aqueous flooding, injected water may displace immiscible fluid preexisting in the pore network model. During aqueous draining, injected immiscible fluid may displace water preexisting in the pore network model. In certain cases, flooding and draining may be fluid flooding and fluid draining. In some cases, fluid may be oil.

Figure 2:
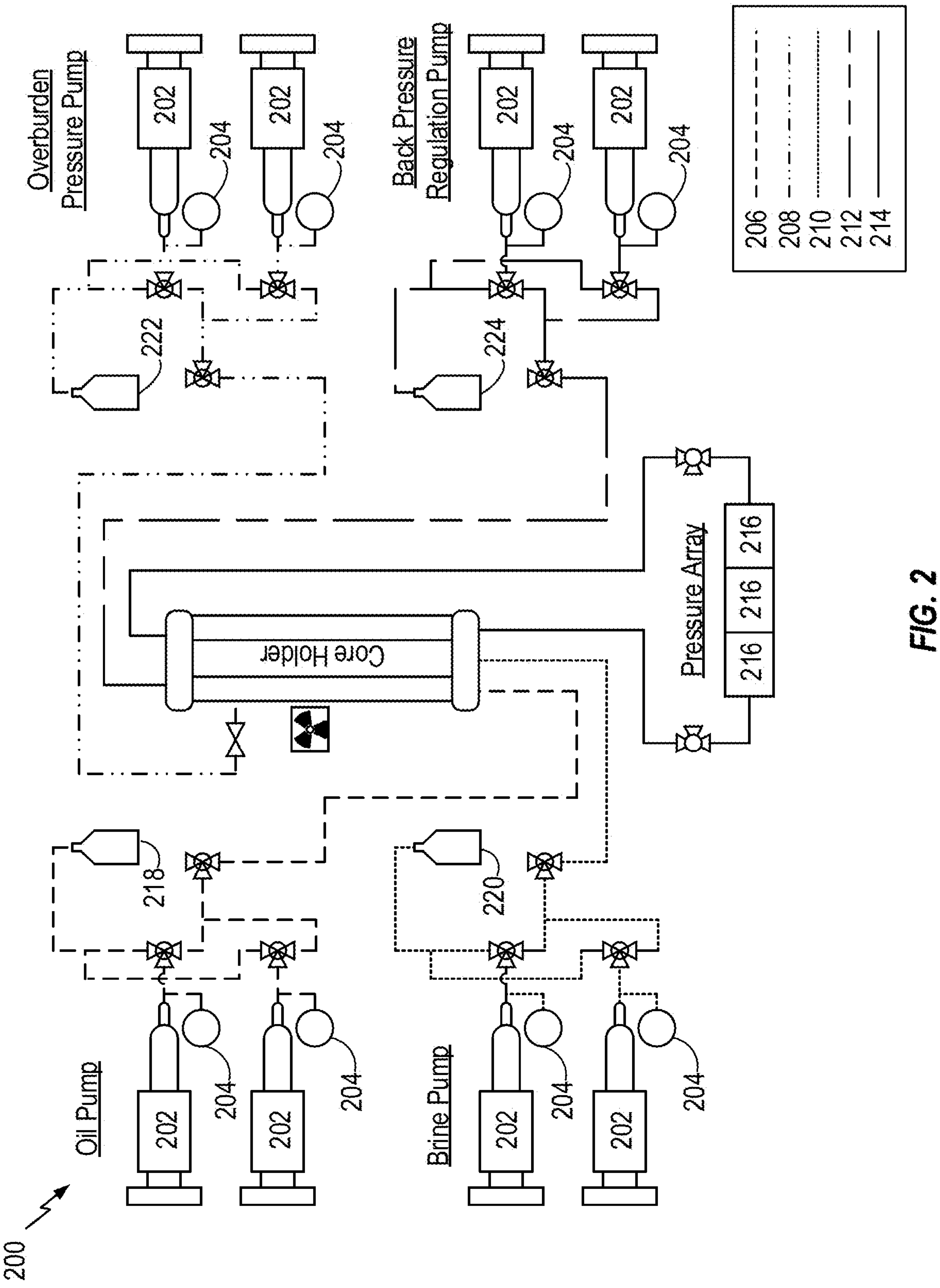
FIG. 2 depicts an example core-flooding instrument for determining the physical and chemical characteristics of a porous media sample.

Flooding or draining of a pore network model may be simulated based in part on scanned images of physical flooding implemented by a flooding instrument 200 of FIG. 2. In some cases, a porous media may undergo a core-flooding experiment to establish an irreducible water saturation, a residual oil saturation, or both. Core-flooding may be enabled by a set of pumps 202, rupture disks 204, pump lines 206-214, differential pressure transducers 216, and source buckets 218-222 working in tandem to flood a porous media sample loaded in a core holder. In some cases, a scanning instrument (e.g., a micro computed tomography (micro-CT) scanner) captures a dry reference image prior to flooding. Scanning occurs in a field of view defined within the core holder. In some cases, the porous media sample may be flooded with brine from bucket 220 via the brine tubing line 206 and scanned again to ensure that the porous media sample is fully saturated. Once the brine flooding is complete, the absolute permeability of the porous media sample may be obtained. The oil flooding may be performed alongside additional brine flooding. Any fluid expelled as a result of overburden pressure (i.e., pressure that compacts pore space and reduces permeability) may be transported via the confining fluid line 208 and collected in bucket 222. Any fluid expelled as a result of the flooding procedure may be transported via the effluent fluid line 212 and collected in bucket 224. In many cases, core sample pressure may be iteratively adjusted during flooding. Pressure may be recorded by one or more differential pressure transducers 216 coupled to the core holder via a transducer line 214.

Scanned images obtained from flooding procedures performed by the flooding instrument 200 of FIG. 2 may be used to extract a pore map representative of the porous media sample prior to, during, or after flooding. The images may be processed to determine characteristics of fluid flow through the porous media sample. In many cases, the images may also be used to extract a representative pore network model.

Imaging of porous media is typically performed using micro-CT imaging. In many cases, commercial micro-CT scanners (e.g., Zeiss scanners) are available for imaging necessary to perform pore network modelling. Images of porous media taken by micro-CT scanners are at a sufficiently high resolution to create a microscale digital image of the porous media.

In the current state of the art, there exists a challenge of extracting porous media characteristics in a manner precise and repeatable to ensure the ultimate stability of future simulations. Currently, techniques for porous media characterization require lengthy step-wise processing known to incur undue computational expense and introduce instability to characterization of the porous media sample. As a result, users may not be able to rely on characterization output to simulate flow conditions in a useful way.

Aspects Related to Multiscale Imaging for Porous Media

Fluid flow modelling through porous media is often utilized to enhance petroleum resource development. In recent years, global demand for energy resources has mobilized development of unconventional petroleum reservoirs as targets for hydrocarbon extraction. The geological formations that comprise these newly developed hydrocarbon reservoirs are ultra-tight shale formations resistant to primary petroleum extraction techniques. A matrix of an ultra-tight unconventional shale reservoir may be characterized by low permeability and low porosity. To extract hydrocarbons from the ultra-tight shale matrix, secondary and tertiary petroleum extraction techniques seek to maximize oil production through the microscale pore networks that comprise a substantial amount of the porosity in the shale matrix.

A robust understanding of fluid flow through microscale pore networks of hydrocarbon reservoirs may be consequential to extracting the trillions of barrels of oil and gas still housed in shale formations globally. Models of fluid flow through a pore network that incorporates permeability, capillary pressure, fluid saturation, contact angle, wettability may help to elucidate specific steps to be taken during resource development to optimize petroleum production. Even so, techniques for characterizing these microscale pore networks are hindered by the computational expense of modeling microscale pore network and extrapolation errors caused by oversimplified characterization of pore geometries.

As discussed above, ideal modeling of fluid flow through porous media would allow for precise, quick, and repeatable characterization of a porous media sample. In a case where the porous media sample is, for example, a cylindrical core sample of a rock having a length of six inches and a diameter of one inch, the core sample is likely to have porosity and permeability that vary across its length and width. This is common in core samples especially in core samples representative of ultra-tight oil formations. Geological processes that form certain oil-bearing rocks can produce heterogeneous morphological features in the rock that may be present even at a micrometer scale. This is especially true for oil-bearing carbonate rocks, which contain micro-porosities that contribute significantly to the overall porosity of the rock. These microscale morphological features may affect the pore network of the core sample, altering the porosity and permeability throughout a core sample. Thus, accurate characterization of fluid flow through a core sample may depend on precisely ascertained and verifiable microscale geometries sufficient to detect heterogeneous properties of a pore network. Using conventional estimation techniques that cannot consistently capture the heterogeneity and complexity of either the core sample or the fluid-fluid interfaces present therein may result in characterization of a porous media sample that cannot be used to consistently describe fluid flow through the core sample.

According to certain aspects of the present disclosure, high-resolution imaging of porous media may be achieved through multi-scale image analysis performed by processing systems operating in parallel. Specifically, overlapping high-resolution images of a porous media sample, which may exceed about 7 millimeters, may be obtained by a scanning instrument (e.g., a micro-CT scanner) and iteratively stitched together based on the overlapping pattern. Stitching procedures may be split across one or more central processing units (CPUs) and/or one or more graphics processing units (GPUs) in a parallel processing architecture. This may allow faster, more accurate modeling of porosity information without loss of vital micro-porosity detail.

The image generated by the stitching procedures described herein may be a two-dimensional (2D) or a three-dimensional (3D) image. 3D imaging may be carried out according to double-precision image stitching operations that facilitate stitching of sub-images. The sub-images may be obtained from iterative micro-CT imaging processes that allow a porous media sample to be digitally represented. Generally these sub-images may be slices. Slices may be 2D representations of a cross-sectional scan of a medium. For example, where the targeted porous medium is the core sample described above, overlapping 2D images slices may be taken perpendicular to the center of a core sample and stitched together. The resultant 2D core image may be further stitched with other stitched 2D core images that lie vertically adjacent to the resultant 2D core sample. Performing this process iteratively may create a high-resolution digital rock sample from which a complex pore network model may be extracted.

According to aspects of the present disclosure, the stitching procedure comprises image registration and image enhancement steps, which may be performed by a processing system architecture comprising at least one or more CPUs operating independently or in combination with one or more graphics processing units GPUs. The one or more CPUs and/or the one or more GPUs may perform the stitching procedures according to a non-transitory computer readable medium that causes the one or more CPUs and/or the one or more GPUs to perform any portion of the stitching procedure. Each of the one or more CPUs may be utilized in combination with a memory having the computer readable medium stored thereon. Each of the one or more CPUs may be utilized in combination with one or more processors. Each of the one or more processors may be parallel processors. Each of the one or more GPUs may be utilized in combination with a memory having the computer readable medium stored thereon. Each of the one or more GPUs be utilized in combination with one or more processors. Each of the one or more processors may be parallel processors. Each of the CPUs and the GPUs may operate independently, or may operate using a message passing interface (MPI) enabling communication between one or more parallel processors for performing the imagine stitching procedure. This may include CPU-CPU communication, CPU-GPU communication, and/or GPU-GPU communication.

To perform the stitching procedures, one or more CPUs may implement a pre-registration procedure that detects an overlap pattern, determines a set of overlap distances for the set of slice images of the porous media sample and registers a composite image comprising any of the set of slice images of the porous media sample. After the pre-registration procedure, one or more CPU in conjunction with one or more GPUs may implement registration and blending procedures that obtain, from the CPUs, a composite image based at least in part on a set of overlap distances for a set of slice images of a porous media sample, determine pixel values for each pixel of the composite image, and generate a blended image corresponding to the set of slice images of the porous media sample based on the pixel values. The one or more GPUs may then train and apply a generative adversarial network for single image super-resolution (SR-GAN) to achieve a super-resolution version of the blended image.

Figure 3:
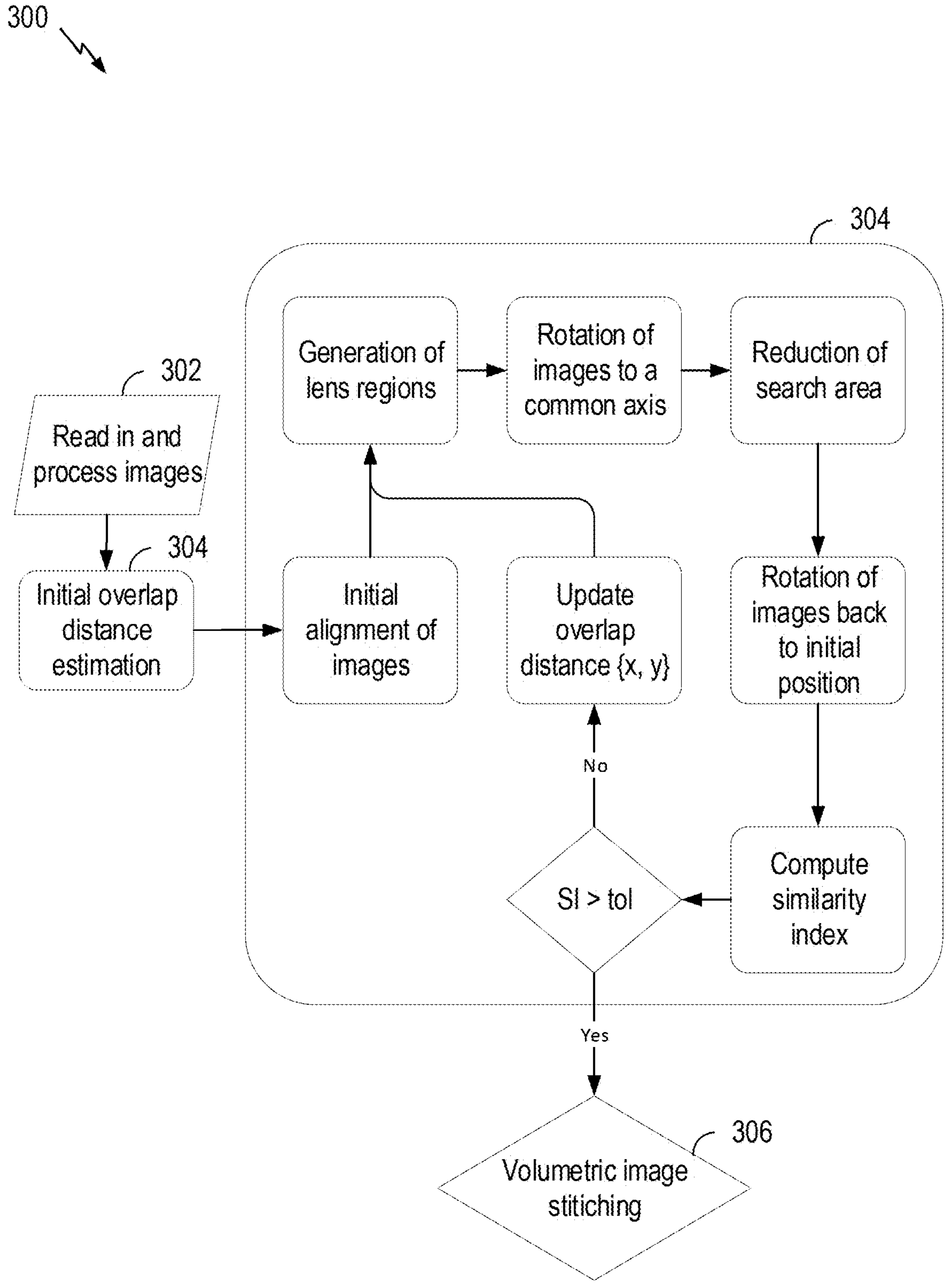
FIG. 3 depicts an example pre-registration procedure for processing images of a porous media by one or more central processing units (CPU).

FIG. 3 illustrates an example pre-registration procedure for processing images of porous media by one or more CPUs. After one or more overlapping slice images of a porous media slice are scanned by a commercial micro-CT scanner, the CPUs read in and process the slice images at 302. At 304, the CPUs estimate the initial overlap distance between each slice image with respect to other images that may overlap. This estimation begins when the CPUs commence an initial alignment of each of the slice images. In one example, the initial alignment may be performed based on detected similarity of intensity between slice images. In another example, the initial alignment may be performed based on a pre-determined configuration of the one or more slice images taken of the porous media slice. After the CPUs perform the initial alignment, the CPUs generate lens regions. In one example, the lens regions may be regions of the one or more slice images where overlapping is detected between the slice images. Based on the lens regions, the CPU may then rotate the slice images to a common axis. Based on the rotation, the CPUs may reduce the search area of the lens regions, then rotate the slice images back to their initial positions. After the slice images are returned to their initial positions, the CPUs may compute a similarity index. If the similarity index exceeds a minimum tolerated similarity value, the CPU may begin image registration by determining whether volumetric image stitching is needed at 306. If the similarity index exceeds a minimum tolerated similarity value, the CPU may update overlap distances and compute another similarity index. If the new similarity index exceeds a minimum tolerated similarity value, the CPU may begin image registration.

Figure 4:
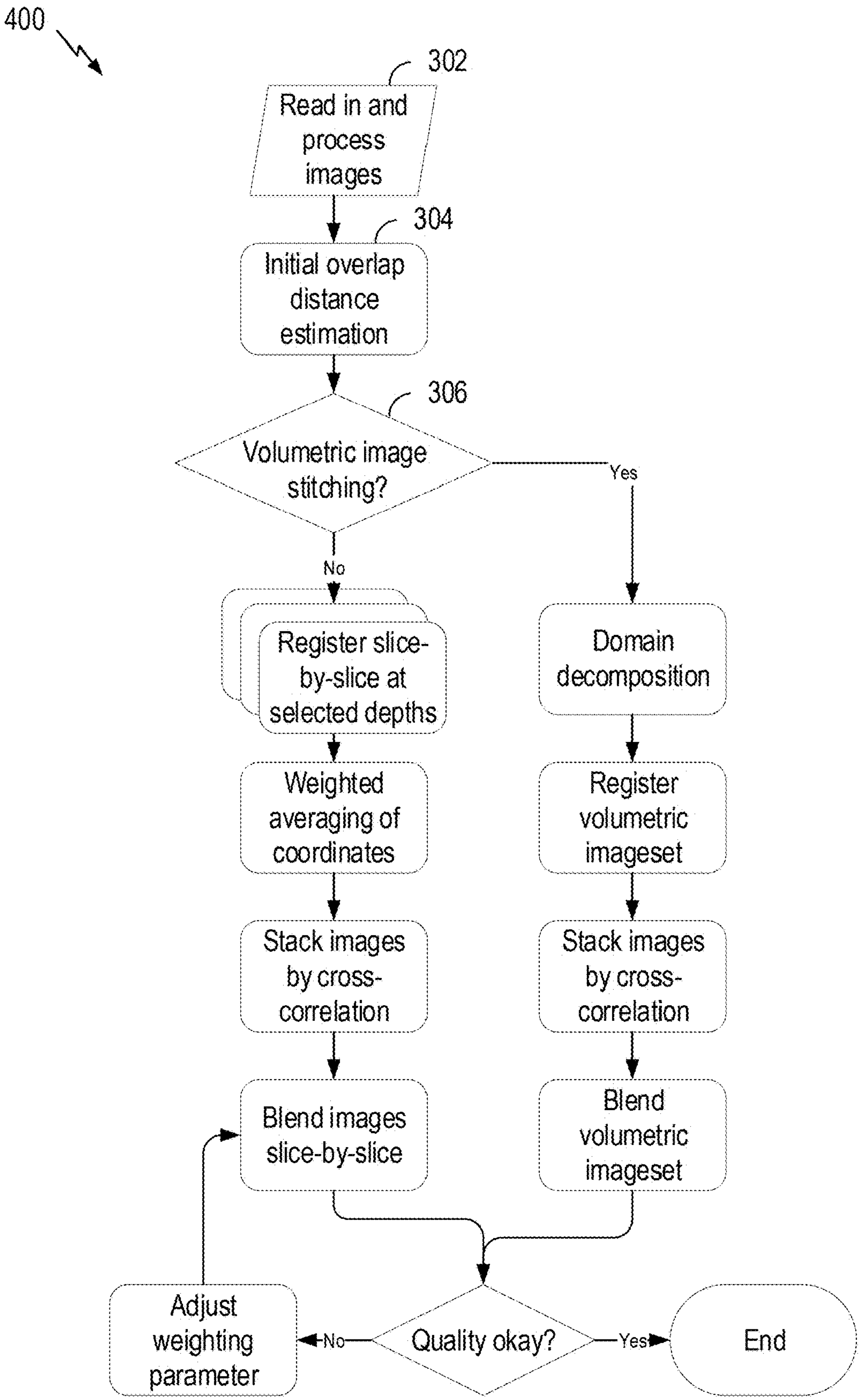
FIG. 4 depicts an example registration and blending procedure for images of porous media by a CPU and a graphics processing unit (GPU).

FIG. 4 illustrates example registration and blending procedures for images of porous media by one or more CPUs and one or more GPUs. After performing 302 and 304 as described above with respect to FIG. 3, the CPUs determine whether to perform volumetric image stitching. In other words, the CPUs determine whether a user seeks an output 2D image or an output 3D image. If the CPUs are not to perform volumetric images stitching (i.e., a user seeks an output 2D image), the CPUs register a composite image for each porous media slice on a slice-by-slice basis according to a selected depth, and sends each composite image to the GPUs. In some cases, the composite image may comprise at least a first slice image of the set of slice images and a second slice image of the set of slice images, wherein the first slice image overlaps with the second slice image. The GPUs determine a weighted average for each composite image, then stack the images by cross-correlation, and blend the composite images. If the CPUs are to perform volumetric images stitching (i.e., a user seeks an output 3D image), the CPUs send the composite image for each porous media slice to the GPUs. The GPUs begin domain decomposition of the composite images. After domain decomposition, the GPUs register a volumetric image set from the composite images, stack the composite images by cross-correlation, and blend the volumetric image based on the stacking.

In both 2D and 3D cases illustrated in FIG. 4, the GPUs then send each blended image to the CPUs, which generate an overlap plot based on each blended image. In some examples, the overlap plot for a given blended image indicates the quality of the blended image. If the overlap plot indicates a lack of quality for the blended images, the CPUs send the overlap plots for each composite image to the GPUs. The GPUs adjust the weighting parameter for each composite or volumetric image corresponding to the received overlap plot, and blend each composite or volumetric image according to the adjusted weighing parameter. If the overlap plot indicates sufficient quality, the CPUs will output a 2D or 3D image of the porous media.

Figure 5:
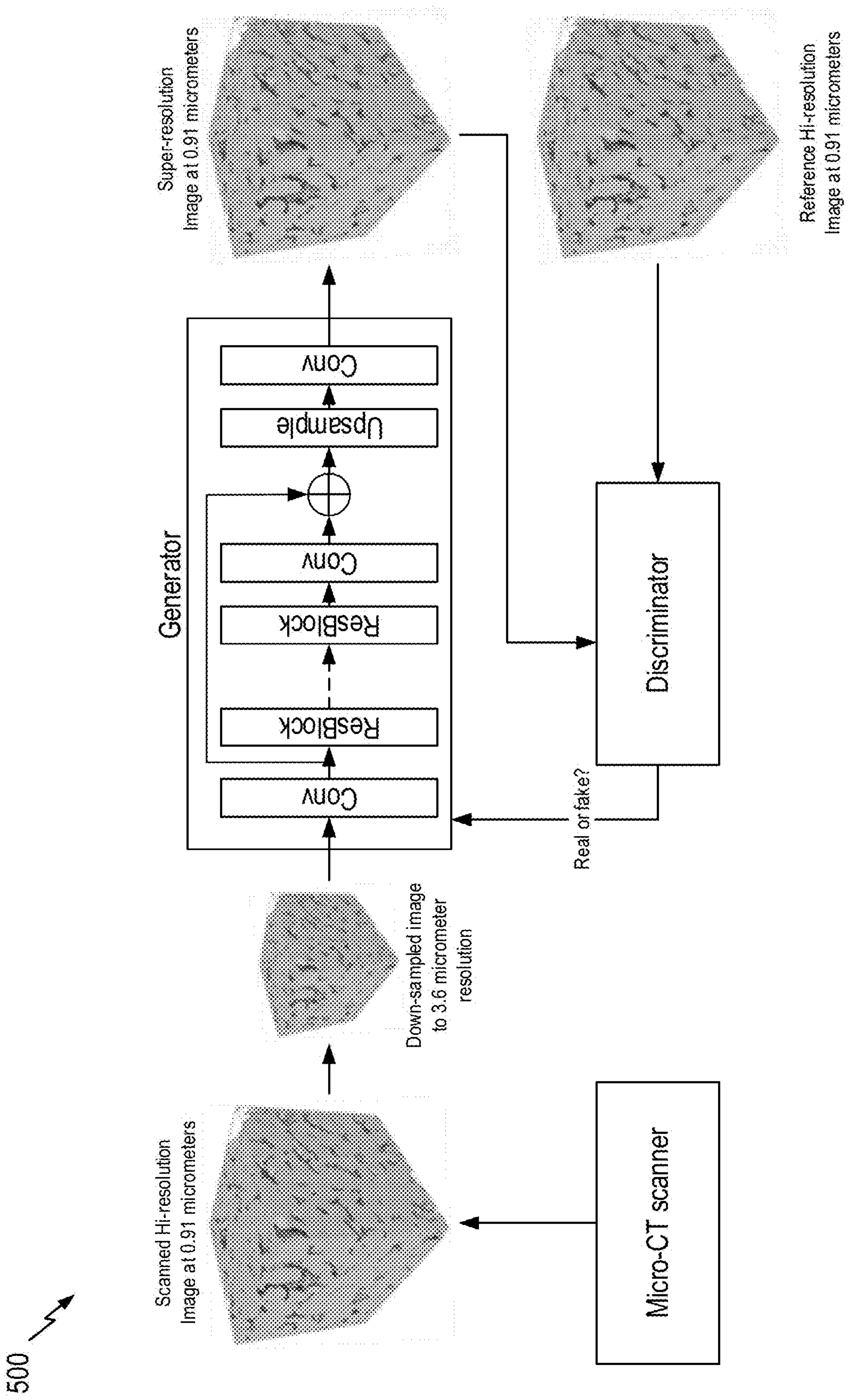
FIG. 5 depicts an example generative adversarial network for single-image super-resolution (SR-GAN).

FIG. 5 illustrates an example generative adversarial network for single image super-resolution (SR-GAN) applied by the one or more GPUs to the blended image after registration and blending procedures. As described above with respect to FIGS. 3 and 4, a high-resolution image (e.g., at 0.91 μm) may be generated by a micro-CT scanner and processed according to registration and blending procedures. The GPUs then apply an SR-GAN to the resultant image to obtain a super-resolution image. The SR-GAN may be trained using, for example, micro-CT scan of porous media that has been scanned at a high-resolution (e.g., at 0.91 μm). These high-resolution image datasets (i.e., the "ground truth" datasets) may be down-sampled by 4 to become low-resolution images (e.g., at 3.6 μm), and both the high-resolution image and the low-resolution image may be used to train the SR-GAN. The SR-GAN may utilize a plurality of residual blocks and a plurality of convolutional layers. The GPUs output a training super-resolution image after SR-GAN processing, then apply a discriminator network to the training super-resolution image to determine whether it is representative of the ground truth image. This procedure may be recursive until the resultant super-resolution adequately represents the ground truth image. This SR-GAN training procedure is further described below.

Implementation of the procedures described in FIGS. 3-5 may allow a user to obtain a high-resolution digital image of a macro-scale porous media sample that is not limited by the field of view accessible to a micro-CT scanner in a single scan. The high-resolution, macro-scale digital image may be useful for fine-grained pore network modeling as described above.

The pre-registration procedure begins when images taken by a scanning instrument (e.g., a micro-CT scanner) capture a set of one or more image slices representative of a cross-section of porous media. In some cases, the cross-section of porous media may correspond to a "depth" characteristic defined for the porous media sample. The depth of a porous media sample may indicate a height value perpendicular to the axis of the sample and falling between the height of the top of the sample and the height of the bottom of the sample.

Figure 6A:
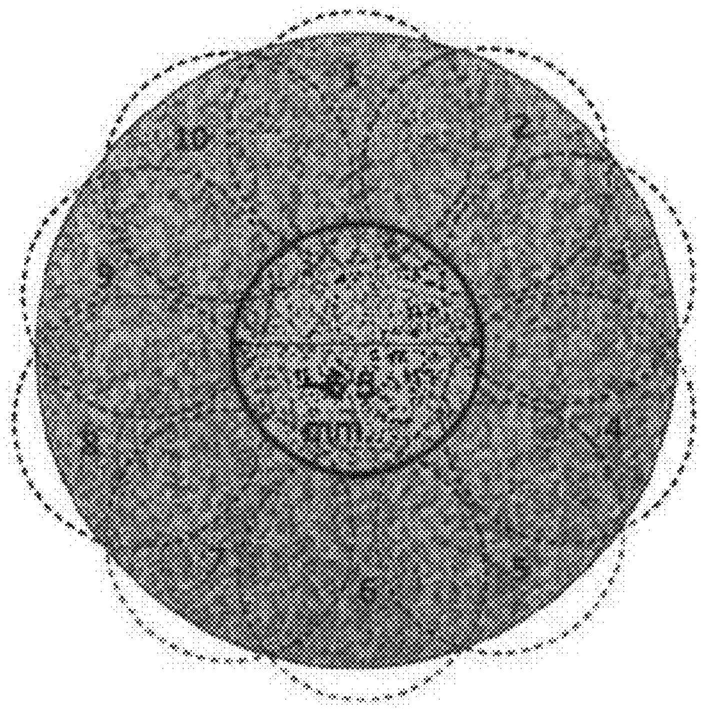
FIG. 6A and FIG. 6B depict an example set of overlapping high-resolution porous media image slices taken by a scanning instrument from an example single rock sample.

FIG. 6A illustrates a configuration implemented by a scanning instrument for scanning image slices of a porous media sample. To obtain the set of image slices in FIG. 6A, a scanning instrument scans eleven circular image slices each having a 6.5 millimeter diameter. The scanning instrument captures a single coaxial image slice covering the center region of the porous media sample. The scanning instrument also captures a planetary configuration of images slices about the coaxial image slice, where each image slice of the planetary configuration is offset 54 degrees from adjacent images slices about the center of the core sample. Each of the set of image slices overlaps with at least one other slice such that the entire cross section is captured in the eleven images. In many cases, the overlap regions may comprise a standard pattern for a given set of image slices obtained according to a configuration. In some cases, an imaging device implementing the pre-registration procedure of FIG. 1 may be able to ascertain overlap distances for a set of image slices according to the imaging configuration implemented by the scanning instrument. In other cases, an imaging device implementing the pre-registration procedure of FIG. 1 may perform overlap detection to ascertain overlap distances. The overlap distances may comprise a set of orientation information including at least rotation, translation, and location information for each image slice. The overlap distances may comprise a set of coordinates defining lens regions comprising mutual information for overlapping image slices. In some cases, the overlap distances may be determined from a preconfigured search area. The search area may be reduced based on a determination of lens regions. In some cases, the overlap distances may be updated based on a similarity index. An imaging device implementing the pre-registration procedure of FIG. 1 may perform the overlap detection automatically or with manual input from a user. As discussed above, overlap detection may be performed by one or more CPUs.

Figure 6B:
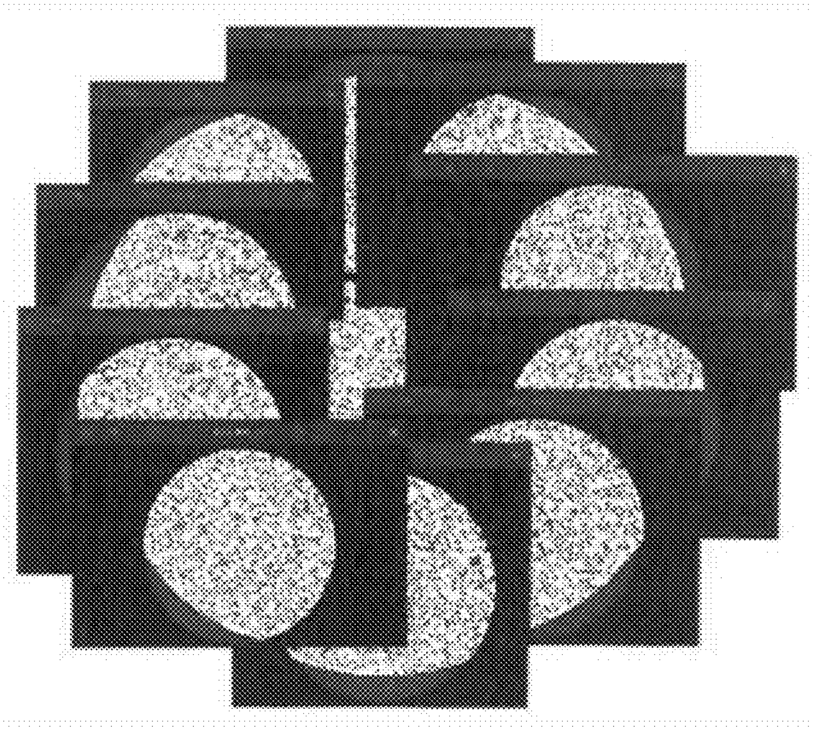

FIG. 6B illustrates an example set of images slices of a porous media scanned according to the configuration of FIG. 6A. In FIG. 6B, a macro-scale core sample of a rock is scanned using a micro-CT scanner at a high resolution of 2.9609 μm. Multiple image slices are taken at a high resolution encompassing the entire range of the sample. These image slices represent a complete cross-section of the macro-scale core sample. The set of image slices may be obtained by one or more CPUs to be read in and processed for stitching.

FIGS. 7A-7D illustrate other example configurations implemented by a scanning instrument for scanning image slices of a porous media sample.

Figure 7A:
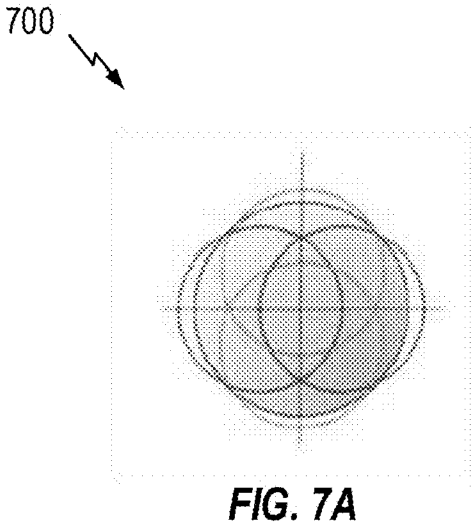
FIG. 7A, FIG. 7B, FIG. 7C, and FIG. 7D depict example overlap configurations for porous media image slices taken by a scanning instrument.

FIG. 7A illustrates a configuration wherein the scanning instrument captures four image slices covering the center region of the porous media sample. None of the four image slices are coaxial with the porous media sample. Instead, the centers of each image slice are placed at $\pi/2$, $2\pi$, $3\pi/2$, and $\pi$ radians relative to the center of the porous media sample, at a distance away from the center of the porous media sample equal to half the radius of the porous media sample. The resulting four image slices each overlap with the center of the pore sample such that the image slices represent a complete cross-section of the macro-scale core sample.

Figure 7B:
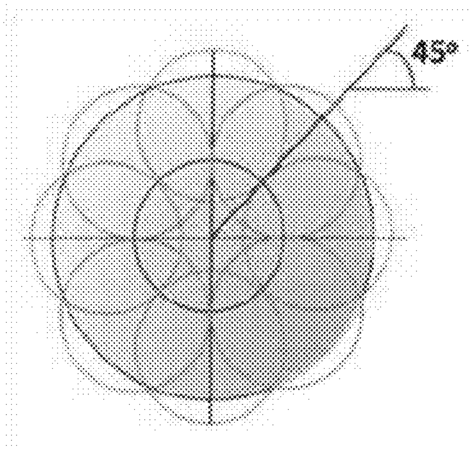

FIG. 7B illustrates a configuration wherein the scanning instrument captures a single coaxial image slice covering the center region of the porous media sample. The scanning instrument also captures a planetary configuration of images slices about the coaxial image slice, where each image slice of the planetary configuration is offset 45 degrees from adjacent images slices about the center of the core sample. To obtain the set of image slices in FIG. 7B, a scanning instrument scans nine circular image slices.

Figure 7C:
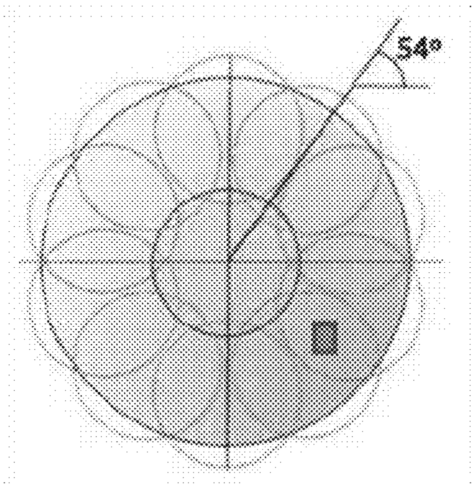

FIG. 7C illustrates a configuration wherein the scanning instrument captures a single coaxial image slice covering the center region of the porous media sample. The scanning instrument also captures a planetary configuration of images slices about the coaxial image slice, where each image slice of the planetary configuration is offset 54 degrees from adjacent images slices about the center of the core sample. To obtain the set of image slices in FIG. 7C, a scanning instrument scans eleven circular image slices. The configuration of FIG. 7C is comparable to the configuration of FIG. 6A.

Figure 7D:
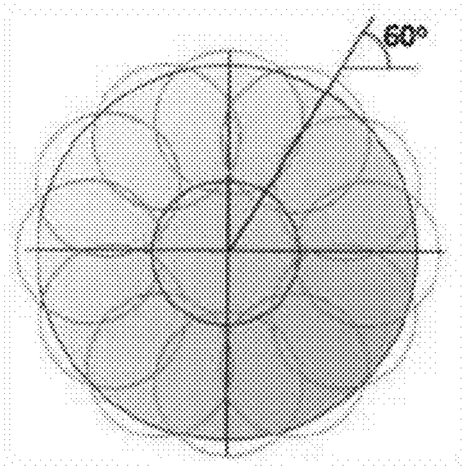

FIG. 7D illustrates a configuration wherein the scanning instrument captures a single coaxial image slice covering the center region of the porous media sample. The scanning instrument also captures a planetary configuration of images slices about the coaxial image slice, where each image slice of the planetary configuration is offset 60 degrees from adjacent images slices about the center of the core sample. To obtain the set of image slices in FIG. 7D, a scanning instrument scans thirteen circular image slices.

An imaging device implementing the pre-registration procedure of FIG. 1 may be able to ascertain overlap distances for a set of image slices according to the example configurations of FIGS. 7A-7D as described with respect to FIG. 3A above. Additional configurations not described above may also be implemented by a scanning instrument and may be used to ascertain overlap distances for a set of image slices in the manner described herein. The configuration utilized by a scanning instrument may depend on the size of the porous media sample. For example, the example configuration of FIG. 7A may be useful for generating image slices for a smaller porous media sample, whereas the example configuration of FIG. 7D may be useful for generating image slices for a larger porous media sample. FIGS. 7B-7D may be used to scan porous media samples having diameters as large as 3.8 centimeters (i.e., 1.5 inches).

As discussed above, each of the set of image slices may be aligned based on at least in part on the overlapping patterns found in the image slices, where the overlapping patterns are useful for determining the overlap distances for each of the overlapping regions of the slices during the pre-registration procedure. Once the initial overlap distances are ascertained and the set of image slices are overlaid, one or more CPUs may implement precise mapping techniques to perform stitching to a higher degree of certainty. Because the high-resolution digital image of a macro-scale porous media sample obtained using techniques described herein may be utilized for modeling fluid flow through a pore network, precise mapping of the overlapped regions is vital capturing an accurate representation of the porous media sample. Without precise imaging, certain imaging artifacts may disrupt represented pore geometries. For example, imaging artifacts may blur rough surfaces of a pore wall, or truncate connective throats that are key to permeability characterization.

Figure 8A:
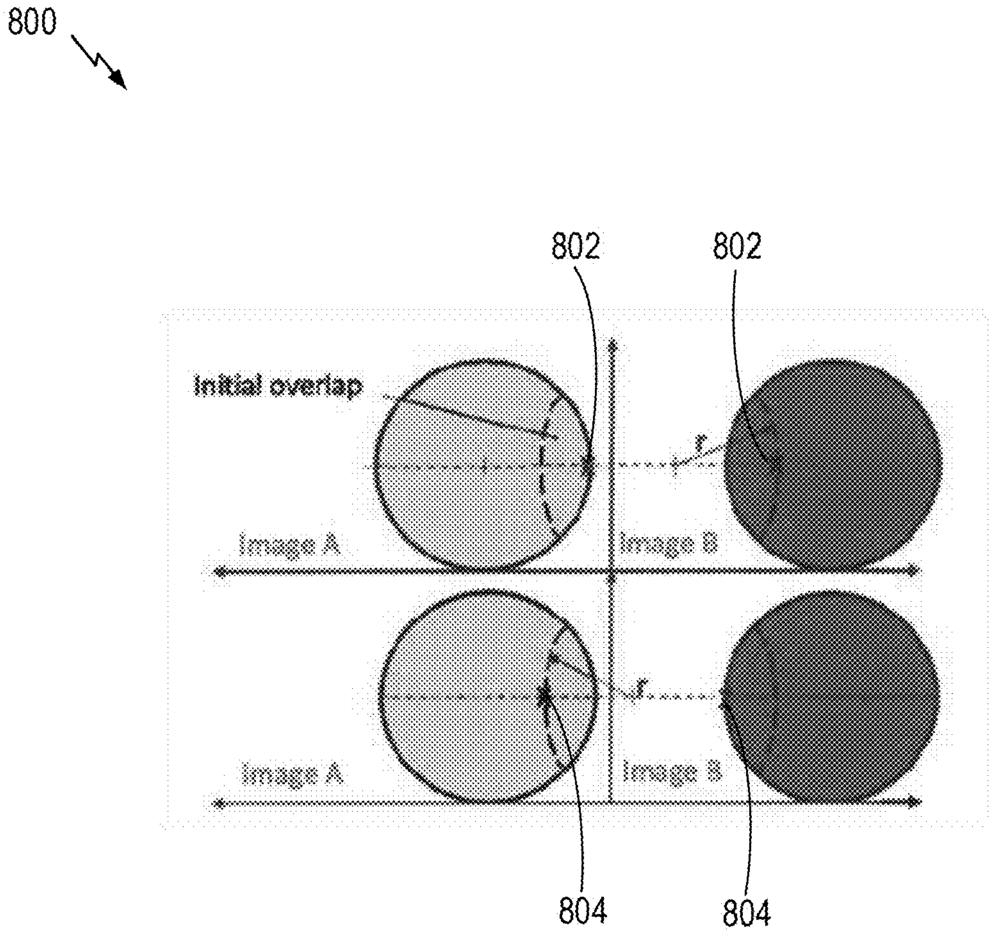
FIG. 8A and FIG. 8B depict an example overlap region for two porous media image slices and intensity histograms indicating the intensity value of pixels falling within the overlap region.

Precise mapping techniques implemented by one or more CPUs may begin with the generation of a lens area for every detected region. FIG. 8A illustrates an example lens area generated from detected overlapping regions. In FIG. 8A, "Image A" represents a first slice image. "Image B" represents a second slice image. Image A and Image B overlap in the concave intersection indicated by the dashed line. The one or more CPUs detect overlap boundaries 802 and 804. The "x" on Image A is coaxial with the "x" on Image B for both 802 and 804. The one or more CPUs may match the "x" points along a horizontal line to determine overlap boundaries 802 and 804. Then, the one or more CPUs may locate the center point of all overlain image slices. The center point of the overlain images slices may be coaxial with the center of the target porous media sample cross-section. Based on the center point of the overlain images slices and the overlap boundaries 802 and 804 determined for each image slice, the one or more CPUs may generate lens regions corresponding to the initial overlap distances. Transformation described herein may be transformation of moving images to fixed images. These transformation may be achieved using linear transformation.

According to certain aspects, the lens regions may comprise overlap distances having (x,y) coordinates that define the boundaries of the lens region. After lens regions are generated, the one or more CPUs may rotate the image slices to a common axis. This rotation may allow the one or more CPUs to ascertain errors and aberration along the overlap boundaries that may need correction. The search area for determining the overlap boundaries may be reduced in order to facilitate more precise overlap boundaries. Once overlap boundaries have undergone the search area reduction, the image slices are moved back to their initial positions. Generation of the lens area may become more complex as the number of image slices is increased. For example, generating the lens regions for the set of image slices scanned according to the thirteen-slice configuration of FIG. 7D will be more complex than generating the lens regions for the set of image slices scanned according to the four-slice configuration of FIG. 7A.

Figure 8B:
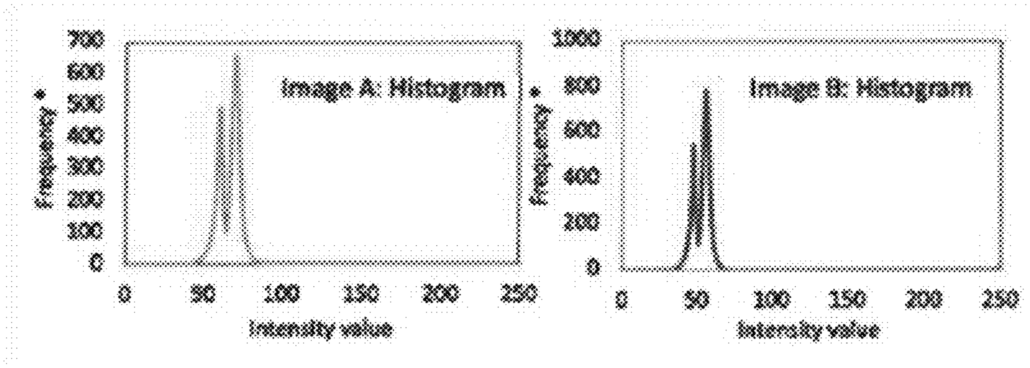

Overlap boundary detection and search area reduction may be performed, at least in part, based on detected intensity values of the overlain slice images. This may be particularly useful when performing registration and blending procedures for image slices with different modalities. FIG. 8B depicts example joint histograms generated for Image A and Image B. The histograms indicate intensity value for a cross section of Images A and B perpendicular to the detected lens section. The intensity value may be based on pixel values (e.g., brightness values) determined for the Images. In many cases, where intensity values are high, it is because the pixel value of Image A is summed with the pixel value of Image B in the portion of the area where the Images overlap. Thus, the lens area is ascertainable from the near-identical variations of intensity across overlapping portions of the set of image slices. The near-identical variations of intensity for overlapping image slices may be considered mutual information. When the lens area is extracted from overlain slice images, one or more CPUs may generate a joint histogram and obtain the mutual information for the overlain slice images based on each level of overlap. The maximum value of the mutual information during the iteration process may represent the initial overlap transformation comprising the lens regions. Each of the lens regions may then register each lens region. The initial overlap transformation may then be used for the registration of the entire image.

Generation of lens areas for a given set of image slices may occur iteratively. After the image slices are moved back to their initial positions, the one or more CPUs may generate a similarity index. The similarity index may be determined based on the intensity ascertained for the lens regions. The one or more CPUs may determine a tolerated similarity index that would allow the registration of a precise composite image comprising the set of one or more overlain image slices. If the similarity index for a given set of image slices is less than the tolerated similarity index, overlap distances are regenerated, and the process of extracting and registering individual lens regions is repeated. If the similarity index for a given set of image slices is equal to or exceeds the tolerated similarity index, the one or more CPUs register a precise composite image comprising the set of one or more overlain image slices. The registered composite image may be based at least on the lens regions, the overlap regions, or coordinates and orientation information defined for the overlap region.

After the one or more CPUs register a 2D composite image from a set of image slices according to techniques described herein, the one or more CPUs may begin registration and blending procedures in conjunction with one or more GPUs (e.g., according to the procedures described in FIG. 4). Prior to registering the composite image as a whole, the one or more CPUs may determine whether to apply volumetric image stitching to the composite image. In many cases, the composite image may be one in a stack of composite images, where each composite image is generated for a certain height of the porous media sample. In these cases, it may be advantageous or even vital to register and blend successive composite images with one another in order to create a 3D, high-resolution image that can be used to extract a high-resolution pore network. In other cases, the composite image may be a single composite image. Single composite images may be useful for model experimentation and validation. Accordingly, 2D high-resolution image registration and blending may be preferable where a 2D high-resolution image is all that is needed in a given situation, especially where 3D high-resolution image registration may be much more computationally expensive.

According to certain aspects, when the one or more CPUs determine that the volumetric stitching is required, the composite image may be delivered to one or more GPUs via an MPI alongside a stack of adjacent composite images. After receiving the stack of registered composite images, the one or more GPUs perform domain decomposition for the stack of composite images. In one example, domain decomposition may split the stack of registered composite images among each of the one or more GPUs in order to optimize the computational expense of registering and blending a stitched volumetric image. In some cases, the splitting may occur by partitioning adjacent composite images. In some cases, the splitting may occur independent of boundaries defined by adjacent image slices.

Figure 9:
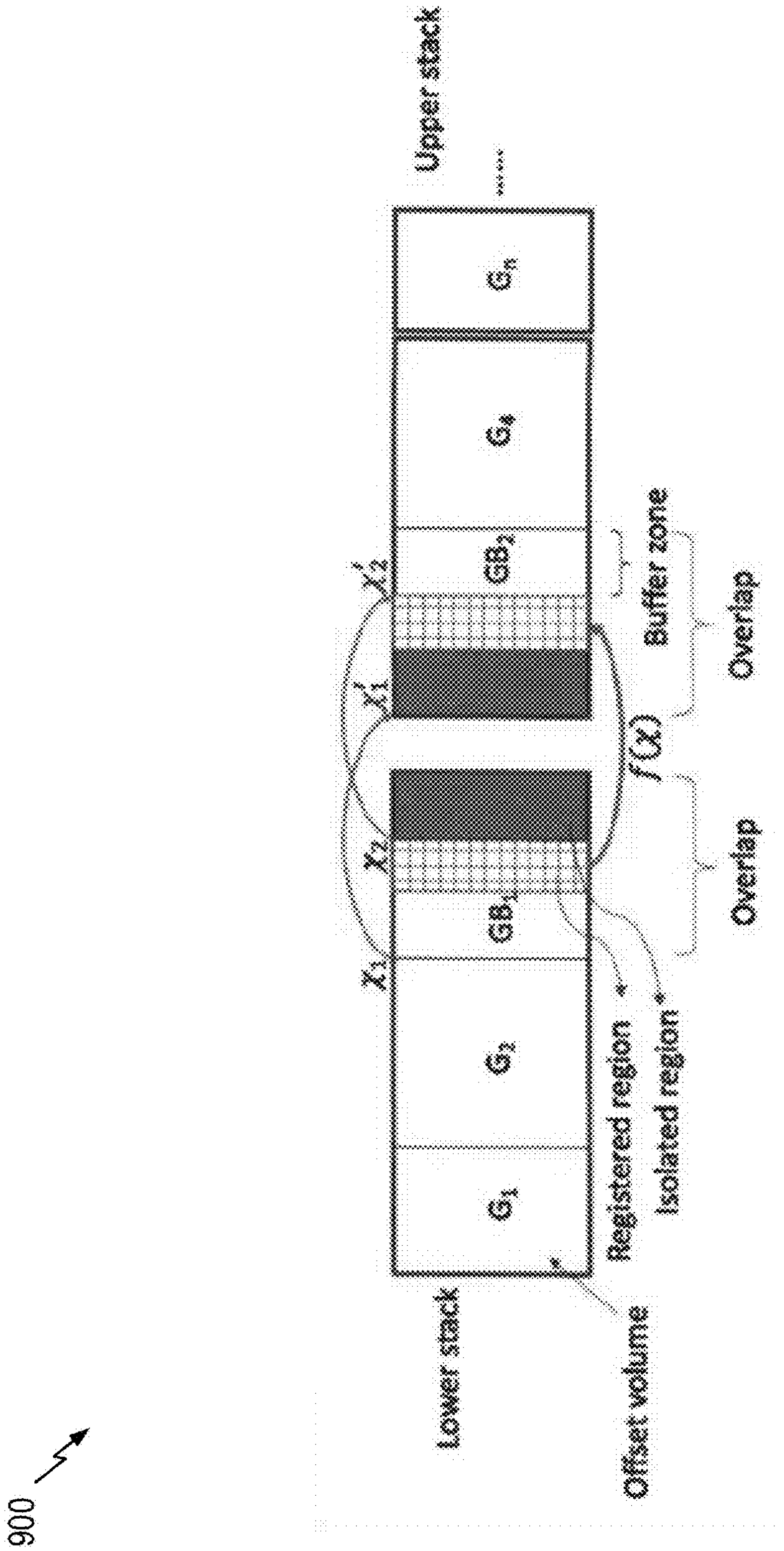
FIG. 9 is a diagram illustrating domain decomposition used to register and blend portions of a three-dimensional (3D) vertical image.

FIG. 9 is an example diagram of mapped decomposed domains that one or more GPUs may use to register and blend portions of a 3D image from a stack of adjacent composite images. One or more GPUs may accelerate the computational processing of blending a stitched volumetric image. Each composite image may be decomposed in the vertical direction based on a prescribed domain size, "$G_n$". Prescribed domain size "Ge" may be iteratively adjusted to ensure load-balancing between the one or more GPUs. Uniform domain sizes may be applied inside the image volume (e.g., $G_2$, $G_4$, $GB_1$, $GB_2$, registered regions, isolated regions) while left-over sizes may be applied at the boundaries (e.g., $G_4$, $G_n$). The one or more GPUs may generate a map f(x) used by the GPUs to communicate between the overlap region in the lower stack and the upper stack. To generate the map, the GPUs determine a lower stack, and upper stack, and a set of isolated regions, a set of registered regions, and a set of buffer zones for each of the upper and lower stack. The overlap regions comprise two buffer zones, two registered regions, and two isolated regions. The registered regions may comprise mutual information. The isolated region of the lower stack may share mutual information with the buffer zone of the upper stack (e.g., $GB_2$). The isolated region of the upper stack may share mutual information with the buffer zone of the lower stack (e.g., $GB_1$). The overlap region may be defined by upper and lower boundaries, where the lower boundary of the lower stack $X_1$ corresponds to the lower boundary of the upper stack $X_1'$, and the upper boundary of the lower stack $X_2$ corresponds to the upper boundary of the upper stack $X_2'$. The isolated regions, which may comprise between 150 to 200 composite images, may be discarded. The registered regions may be registered and used for later vertical stitching operations.

After the one or more GPUs perform the domain decomposition, the GPUs register the entire volumetric image and stack the images using cross-correlation according to the overlap boundary detection techniques described above with respect to pre-registration procedures. The GPUs use the resultant stacked composite image to blend the volumetric image according to blending techniques that are described with respect to 2D blending below. After blending the volumetric image, the one or more GPUs send the volumetric to the one or more CPUs.

According to certain aspects, when the one or more CPUs determine that the volumetric stitching is not required, the one or more CPUs may register the 2D stitched composite image iteratively, slice by slice, until each of the set of image slices is registered for the composite image such that the composite image is registered in its entirety. After the composite image is fully registered, the one or more CPUs may send the composite images to the one or more GPUs. The one or more GPUs may determine the weighted average of the overlap distance coordinates for the composite image. The one or more GPUs may then stack the set of one or more image slices of the composite image using cross-correlation.

Based on the stacking of the composite image, the one or more GPUs may blend the composite image.

After receiving a 2D or 3D blended composite image, the one or more CPUs may perform a quality check. It is vital that pore boundaries represented by the output porous media image be well defined. The output image may be used to generate a high-resolution pore network model, and any artifacts remaining in the image after registration and blending may lead to sub-optimal pore network model performance. The quality check allows for sufficient minimization of artifacts within the image.

According to certain aspects, the quality check may begin when one or more CPUs generate a registration coordinate plot for the blended composite image based on the stacking and blending. The registration coordinate plot may provide a more accurate set of overlap distances for the blended composite image, at least in part by providing updated overlap distances based on new values, (x,y), for the set of image slices. If the registration coordinate plot is dissimilar to the initial overlap distances to an insufficient degree, the one or more CPUs send the registration coordinate plot to the one or more GPUs for adjustment of weighting parameters as described above. If the registration coordinate plot is sufficiently similar to the initial overlap distances, the one or more CPUs will not initiate a quality check, and will end the registration and blending procedures by releasing an output image.

If the registration coordinate plot is dissimilar, the one or more CPUs send the registration plot back to the one or more GPUs. The one or more GPUs may use the registration coordinate plot to normalize the blended composite image. For example, if, based on a blended composite image from the one or more GPUs, the one or more CPUs ascertain coordinates in the x-y direction that better reflect the position of the set of image slices as scanned, the one or more GPUs may blend the image according to the coordinates, and carry out a subsequent quality step by checking if the images are too bright compared to the average brightness of the image. In some cases, the center image may be given more weight compared to the outer edges. As a result, the final output image may have a more consistent pixel map for the image slices, allowing for increased accuracy of a subsequent pore model.

Figure 10:
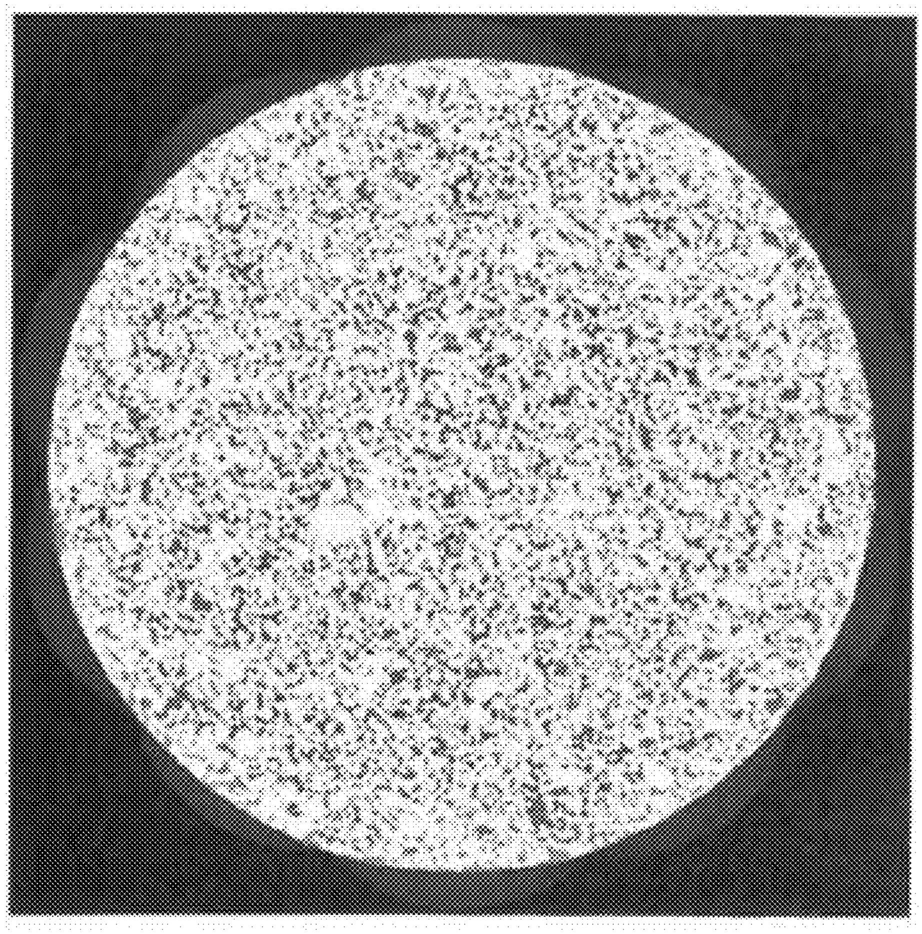
FIG. 10 depicts an example high resolution output image, generated according to certain aspects of the present disclosure.

An example registered and blended macro-sized output image is illustrated in FIG. 10. A fully registered and blended macro-core image as depicted in FIG. 10 may have a resolution of 2.9609 μm.

According to certain aspects, the maximum number of registration and blending procedure iterations for a 2D image may be given by:

$$n_R = \sum_{i=n} \mathbb{Z} - 1$$

In the above equation, $n_R$ is the number of registration steps performed to obtain an output image, n is the total number of images to be registered, and Z is the computational space for the set of each image. Accordingly, to stitch eleven images together, it may take ten registration and blending steps to obtain the full image, which may be computationally expensive. In certain cases, where artifacts (e.g., “ring” artifacts) occur more often for a given set of image slices, computational expense and time may be further increased. Thus, GPU acceleration may be applied during registration and blending procedures to improve blending operations.

After outputting the macro-size image, the one or more GPUs may process the macro-sized image through a trained SR-GAN to obtain a final super-resolution image for pore network extraction. According to some aspects, training and implementing the SR-GAN may use artificial intelligence (AI) techniques for enhancement of 3D image quality. In some cases, AI enhanced images of porous media may increase image resolution by up to four times the original resolution. This may lead to a reduction in the peak signal to noise ratio (PSNR) and structural similarity index (SSIM) and possibly the loss of connectivity information within a PNM.

The GPUs may train the SR-GAN, for example, micro-CT scan of porous media that has been scanned at a high-resolution (e.g., at 0.91 μm). These ground truth datasets may be down-sampled by 4 to become low-resolution images (e.g., at 3.6 μm), and both the high-resolution image and the low-resolution image may be used to train the SR-GAN. The SR-GAN may utilize a plurality of residual blocks and a plurality of convolutional layers. The GPUs output a training super-resolution image after SR-GAN processing, then apply a discriminator network to the training super-resolution image to determine whether it is representative of the ground truth image. This procedure may be recursive until the resultant super-resolution adequately represents the ground truth image.

According to one aspect of the present disclosure, one or more GPUs may achieve image super-resolution using a generator and a discriminator network to train an SR-GAN network to apply to a registered and blended image. The generator implements noise that tries to “trick” the discriminator network into opting for a wrong output, while the discriminator judges between the generated noise and the reference image until a desired metric value is obtained. To begin, the GPUs may direct the generator to produce an upscaled version of low-resolution images (e.g., like the down-scaled image of FIG. 5). The GPUs may then train the discriminator network to differentiate between super-resolved images and the original high-resolution photo-realistic images. As the training progresses, the discriminator may update the weights of the generator to facilitate the generation of outputs that exhibit photo-realism. The one or more GPUs may then output an image that closely matches the reference image as a result of a loss function which is based on perceptual losses rather than pixel-wise losses. In certain cases, the perceptual loss function combines the content of one image and the style of another, which may help to minimize the feature reconstruction and style losses.

Aspects of the present disclosure may process both 2D and 3D images. To achieve efficient processing of both 2D and 3D images, the generator of the SR-GAN may utilize 8 residual blocks and apply a linear learning to the processed data. During training, the one or more GPUs may introduce noise at each epoch to the low-resolution image. The generator then creates several realizations of the super-resolution images in a pre-training step. In the pre-training, pixel-wise losses, such as mean square errors, may be applied for computing of the losses. The losses at each step are reduced as the weights are updated through backward propagation. After a certain number of epochs are reached or when the PSNR is constant (whichever occurs first), the pre-training is completed and the weights are saved.

Figure 11:
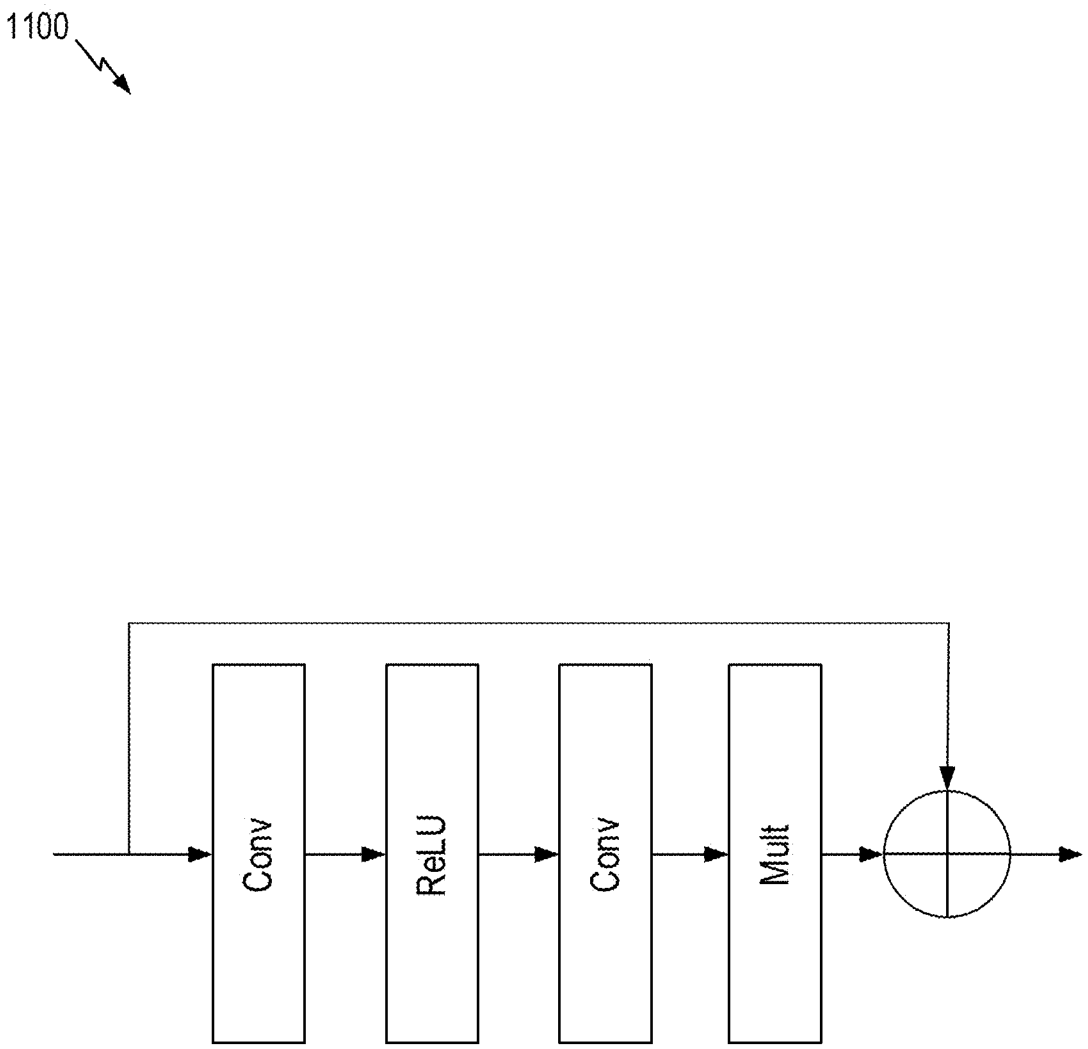
FIG. 11 depicts an example residual network utilized in the SR-GAN.

The generator may utilize a plurality of residual blocks. FIG. 11 illustrates an example residual block implemented in the SR-GAN described according to aspects of the present disclosure. The residual block may have convolutional layers (e.g. "Conv") (e.g., a 3×3 convolutional layer) interpolated between at least one activation layer (e.g. "ReLU") and at least one multiplier layer (e.g., "Mult"). Data passing through a residual block may be recursively fed through the residual block until a certain threshold is reached.

Figure 12:
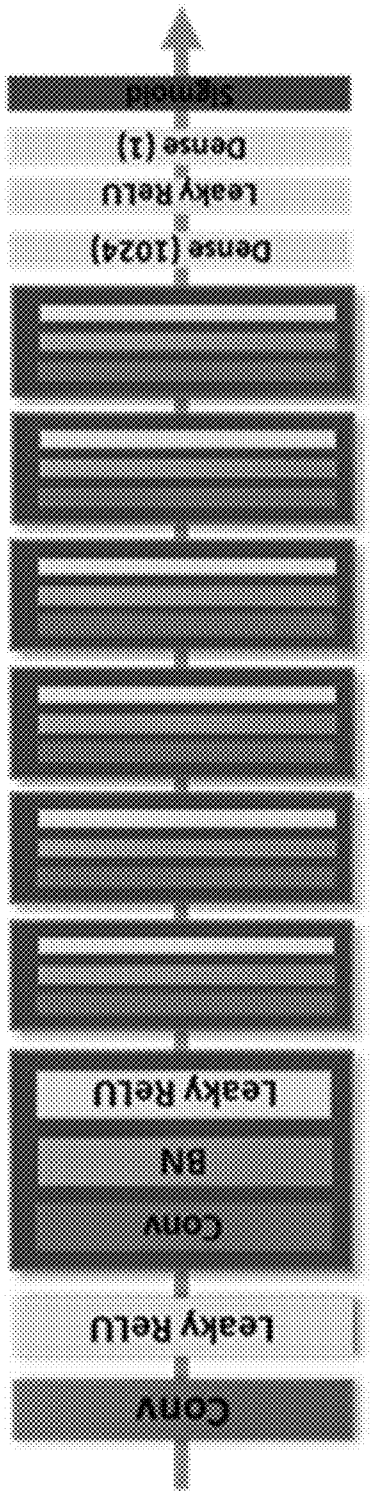
FIG. 12 depicts an example discriminator block utilized in the SR-GAN.

The one or more GPUs then begin a second cycle of training by employing a discriminator network. An example discriminator is illustrated in FIG. 12. The perceptual losses are employed at this stage from a visual geometry group (VGG) network. The weights from the pre-training process may be loaded and used to feed the discriminator. At this point, the SR images have been trained. Perceptual realism of the SR images may be actualized by comparing the difference in the style and content of the image with that of a pre-trained network at $\phi_{i,j}$, where $\phi$ is the feature map at the j-th convolution after activation and before the i-th max-pooling layer. In certain cases, i=5 and j=4. Adversarial losses may be computed based on binary cross-entropy to push the solution to a natural image manifold. As this process continues, the weights of the generator are updated. Accordingly, the SR-GAN can be used for generating super-resolution images after training.

Figure 13:
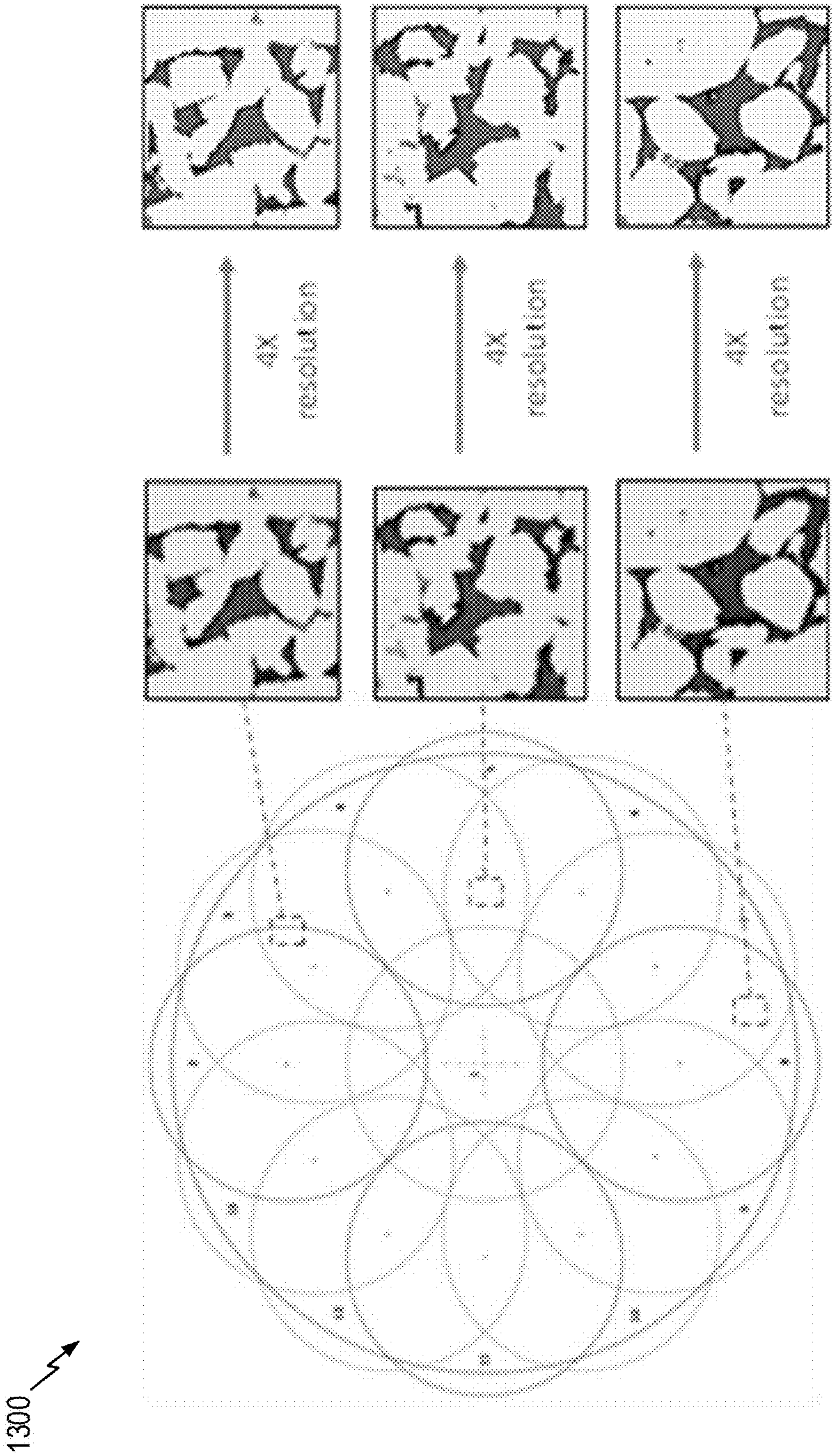
FIG. 13 depicts an example super-resolution output image, generated according to certain aspects of the present disclosure

When the one or more GPUs use the SR-GAN to generate super-resolution images of a porous media sample, portions of the registered and blended images may have a significant increase on resolution as illustrated in FIG. 13.

Implementation of aspects of the present disclosure allow for imaging of porous media samples sufficient to support generation of an accurate pore network model. An accurate pore network model generated from a multiscale image according to aspects described above may accurately depict morphological features within porous media having microscale heterogeneity. By implementing precise image stitching described herein, the heterogeneity of porous media samples exceeding 7 millimeters may be represented in a model such that accurate permeability, capillary pressure, fluid saturation, contact angle, and wettability values may be estimated based on vital pore and throat information for the whole of the sample. Users like, for example, engineers who may use techniques described herein for developing hydrocarbon reservoirs for petroleum production may obtain a more robust understanding of fluid flow through microscale pore networks of targeted reservoirs. The techniques described herein may reduce porous media sample characterization errors to the benefit of all users seeking a more comprehensive understanding of any given porous media.

Example Methods

Figure 14:
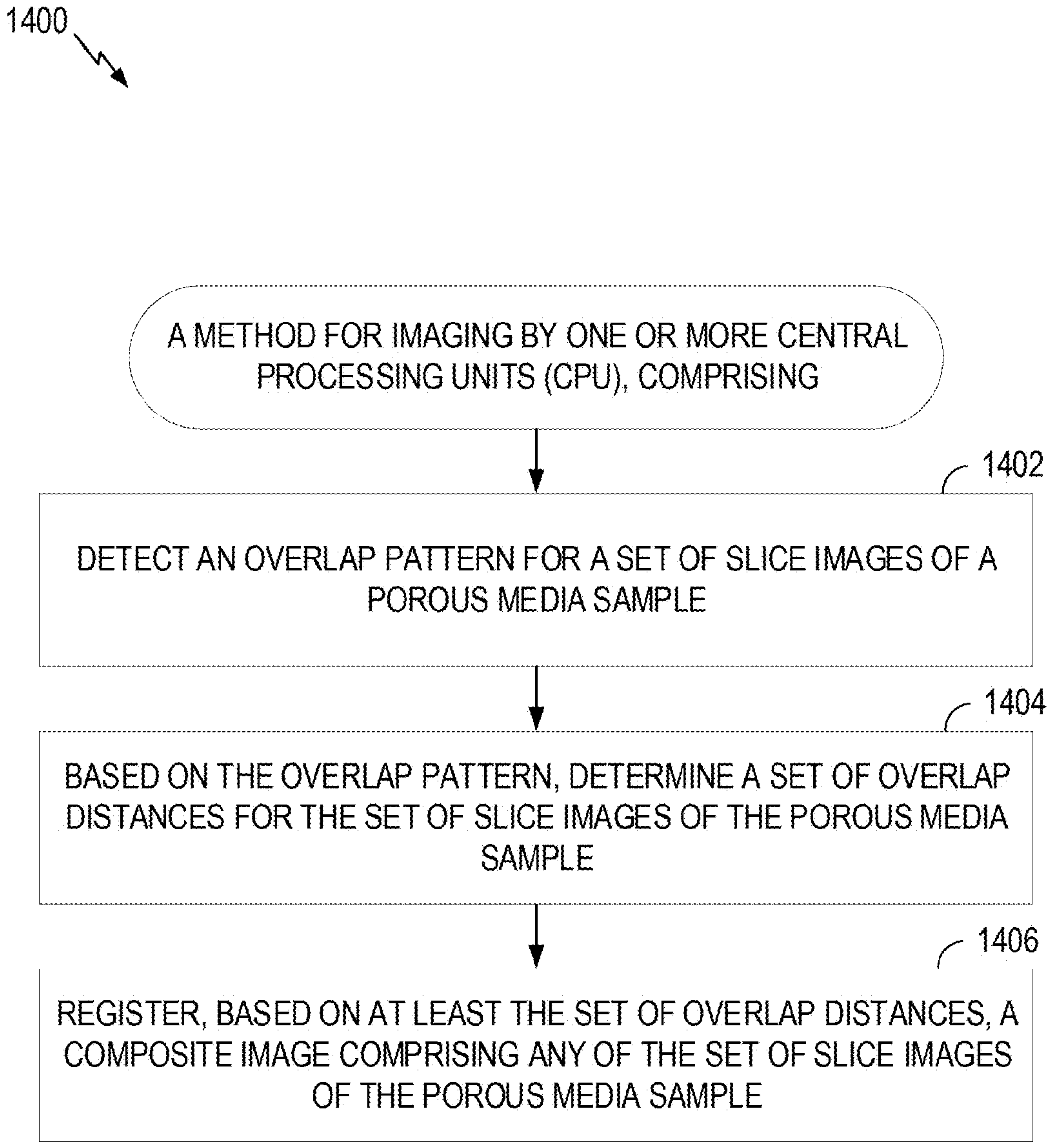
FIG. 14 is a flow diagram illustrating certain operations by one or more CPUs, according to certain aspects of the present disclosure.
Figure 16:
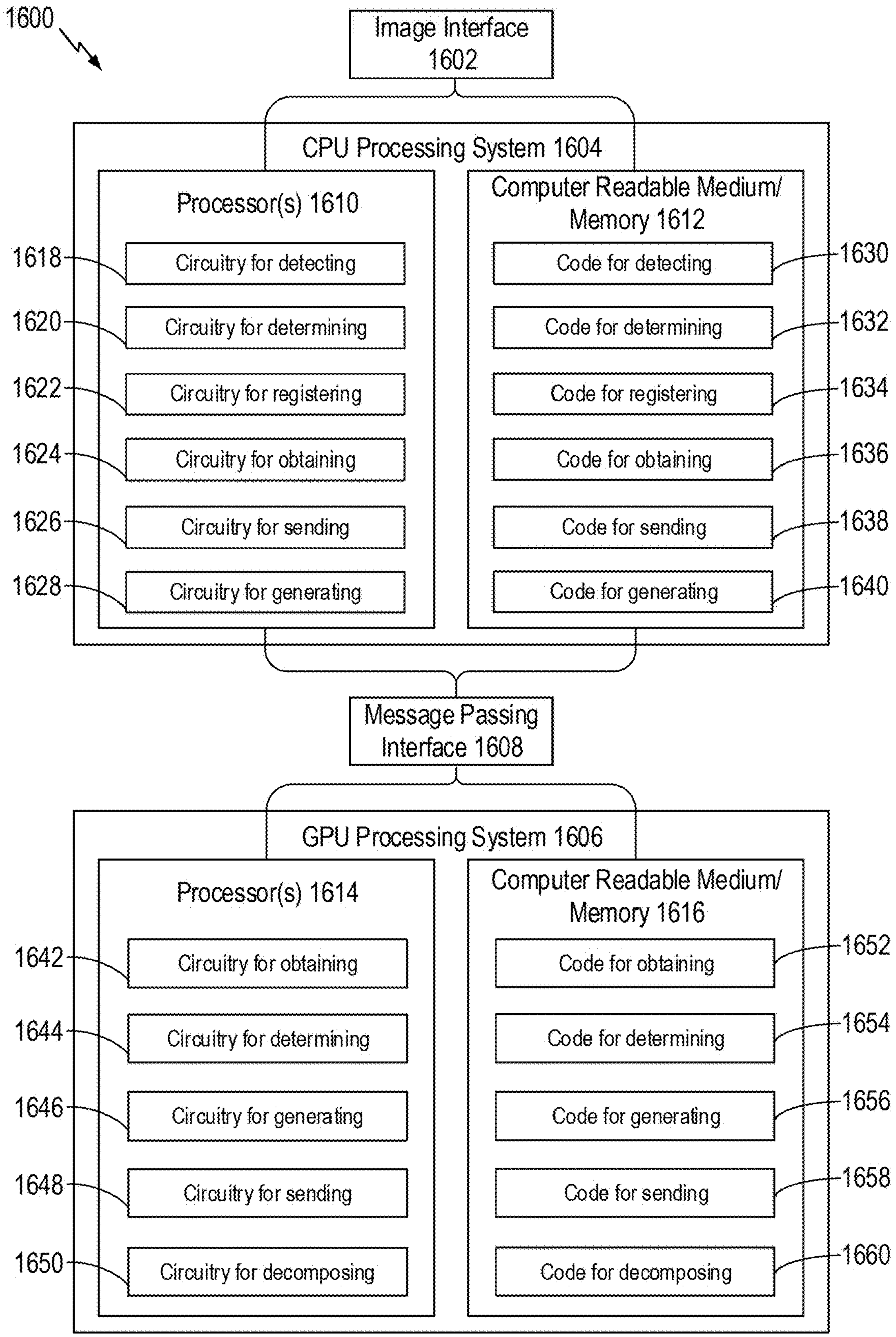
FIG. 16 is an example device for imaging of porous media.

FIG. 14 depicts a method 1400 for processing images of porous media by one or more CPUs, such as the CPUs of the imaging device 1600 of FIG. 16.

Method 1400 begins at 1402 with one or more CPUs detecting an overlap pattern for a set of slice images of a porous media sample. In one example, the overlap pattern may be based in part on configurations implemented by a scanning instrument for scanning image slices of a porous media sample. In one example, the overlap pattern may be based on mutual information shared by at least two image slices.

Method 1400 continues to step 1404 with one or more CPUs, based on the overlap pattern, determining a set of overlap distances for the set of slice images of the porous media sample. In one example, the overlap distances may comprise orientation information including at least rotation, translation, and location information for each image slice. In one example, the overlap distances may comprise (x,y) coordinates indicating a lens region of overlapping information for a set of images slices.

Method 1400 continues to step 1406 with one or more CPUs registering, based on at least the set of overlap distances, a composite image comprising any of the set of slice images of the porous media sample. In one example, the registration of the composite image may be based on a pre-registration procedure, wherein lens regions are calculated to ascertain and update overlap distances.

In one aspect, method 1400, or any aspect related to it, may be performed by an apparatus, such as imaging device 1600 of FIG. 16, which includes various components operable, configured, or adapted to perform the method 1400. Imaging device 1600 is described below in further detail.

Note that FIG. 14 is just one example of a method, and other methods including fewer, additional, or alternative steps are possible consistent with this disclosure.

Figure 15:
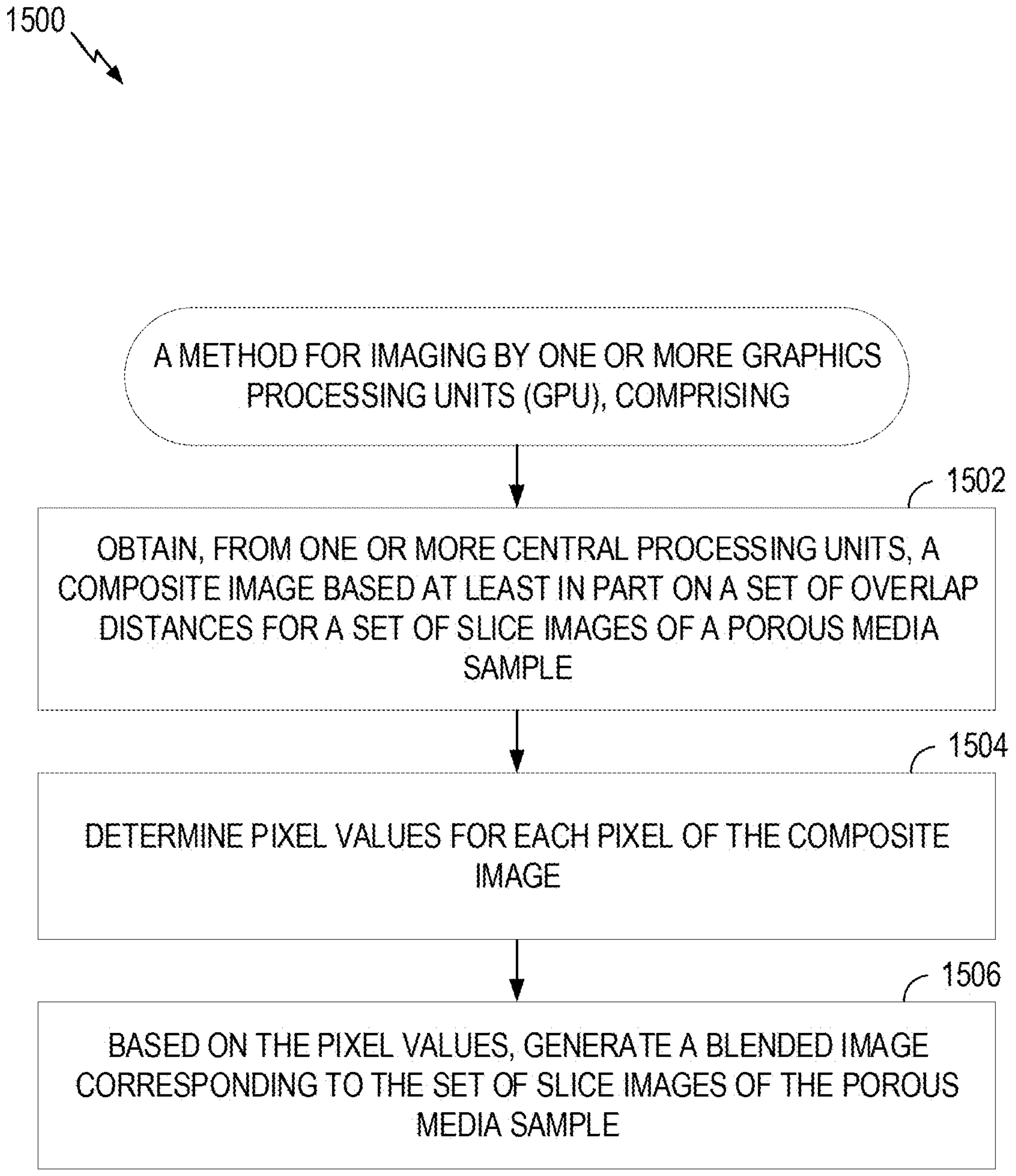
FIG. 15 is a flow diagram illustrating certain operations by one or more GPUs, according to certain aspects of the present disclosure.

FIG. 15 depicts a method 1500 for multiscale imaging of porous media by one or more GPUs, such as the GPUs of the imaging device 1600 of FIG. 16.

Method 1500 begins at 1502 with one or more GPUs obtaining, from one or more CPUs, a composite image based at least in part on a set of overlap distances for a set of slice images of a porous media sample. In one example, the composite image may be generated by one or more CPUs according to a pre-registration procedure. In one example, the one or more GPUs obtain the composite image via an MPI.

Method 1500 continues to step 1504 with one or more GPUs determining pixel values for each pixel of the composite image. In one example, pixel values may be brighter for pixels within a region where image slices overlap.

Method 1500 continues to step 1506 with one or more GPUs, based on the pixel values, generating a blended image corresponding to the set of slice images of the porous media sample. In one example, generating a blended image may comprise blending the composite image based on average pixel values.

In one aspect, method 1500, or any aspect related to it, may be performed by an apparatus, such as imaging device 1600 of FIG. 16, which includes various components operable, configured, or adapted to perform the method 1500. Imaging device 1600 is described below in further detail.

Note that FIG. 15 is just one example of a method, and other methods including fewer, additional, or alternative steps are possible consistent with this disclosure.

Example Imaging Device

FIG. 16 depicts aspects of an example porous media imaging device 1600. In some aspect, the imaging device 1600 comprises one or more CPUs, one or more GPUs, or both as described above with respect to FIGS. 3-5.

The imaging device 1600 includes a CPU processing system 1604 coupled to an image interface 1602 (e.g., a user interface or and/or an image generator such as a commercial micro-CT scanner). The CPU processing system 1604 may be configured to perform processing functions for the imaging device 1600, including multiscale imaging of porous media generated by the imaging device 1600.

The CPU processing system 1604 includes one or more processors 1610. The one or more processors 1610 are coupled to a computer-readable medium/memory 1612 via a bus. The one or more processors 1610 and the computer-readable medium/memory 1612 may communicate with the one or more processor 1614 and the computer-readable medium/memory 1616 of the GPU processing system 1606 via a message passing interface (MPI) 1608. In certain aspects, the computer-readable medium/memory 1612 is configured to store instructions (e.g., computer-executable code) that when executed by the one or more processors 1610, cause the one or more processors 1610 to perform the method 1400 described with respect to FIG. 14, or any aspect related to it. Note that reference to a processor performing a function of imaging device 1600 may include one or more processors performing that function of imaging device 1600.

In the depicted example, computer-readable medium/memory 1612 stores code (e.g., executable instructions) for detecting 1630, code for determining 1632, code for registering 1634, code for obtaining 1636, code for sending 1638, and code for generating 1640. Processing of the code 1630-1640 may cause the imaging device 1600 to perform the method 1400 described with respect to FIG. 14, or any aspect related to it.

The one or more processors 1610 include circuitry configured to implement (e.g., execute) the code stored in the computer-readable medium/memory 1612, including circuitry for detecting 1618, circuitry for determining 1620, circuitry for registering 1622, circuitry for obtaining 1624, circuitry for sending 1626, and circuitry for generating 1628. Processing with circuitry 1618-1628 may cause the imaging device 1600 to perform the method 800 described with respect to FIG. 8, or any aspect related to it.

Various components of the imaging device 1600 may provide means for performing the method 1400 described with respect to FIG. 14, or any aspect related to it.

The imaging device 1600 includes a GPU processing system 1606. The GPU processing system 1606 may be configured to perform processing functions for the imaging device 1600, including multiscale imaging of porous media generated by the imaging device 1600.

The GPU processing system 1606 includes one or more processors 1614. The one or more processors 1614 are coupled to a computer-readable medium/memory 1616 via a bus. The one or more processors 1614 and the computer-readable medium/memory 1616 may communicate with the one or more processor 1610 and the computer-readable medium/memory 1612 of the CPU processing system 1604 via an MPI 1608. In certain aspects, the computer-readable medium/memory 1616 is configured to store instructions (e.g., computer-executable code) that when executed by the one or more processors 1614, cause the one or more processors 1614 to perform the method 1500 described with respect to FIG. 15, or any aspect related to it. Note that reference to a processor performing a function of imaging device 1600 may include one or more processors performing that function of imaging device 1600.

In the depicted example, computer-readable medium/memory 1616 stores code (e.g., executable instructions) for obtaining 1652, code for determining 1654, code for generating 1656, code for sending 1658, and code for decomposing 1660. Processing of the code 1652-1660 may cause the imaging device 1600 to perform the method 1500 described with respect to FIG. 15, or any aspect related to it.

The one or more processors 1614 include circuitry configured to implement (e.g., execute) the code stored in the computer-readable medium/memory 1616, including circuitry for obtaining 1642, circuitry for determining 1644, circuitry for generating 1646, circuitry for sending 1648, and circuitry for decomposing 1650. Processing with circuitry 1642-1650 may cause the imaging device 1600 to perform the method 1500 described with respect to FIG. 15, or any aspect related to it.

Various components of the imaging device 1600 may provide means for performing the method 1500 described with respect to FIG. 15, or any aspect related to it.

Example Aspects

Implementation examples are described in the following numbered clauses:

Aspect 1: A method for image processing by one or more central processing units (CPU), comprising: detecting an overlap pattern for a set of slice images of a porous media sample; based on the overlap pattern, determining a set of overlap distances for the set of slice images of the porous media sample; and registering, based on at least the set of overlap distances, a composite image comprising any of the set of slice images of the porous media sample.

Aspect 2: The method of aspect 1, wherein the set of overlap distances comprise orientation information for the set of slice images of the porous media sample.

Aspect 3: The method of any one of aspects 1-2, further comprising obtaining the set of slice images of a porous media sample.

Aspect 4: The method of any one of aspects 1-3, further comprising sending the composite image to one or more graphics processing units (GPUs).

Aspect 5: The method of any one of aspects 1-4, wherein the composite image comprises at least a first slice image of the set of slice images and a second slice image of the set of slice images, wherein the first slice image overlaps with the second slice image.

Aspect 6: The method of any one of aspects 1-5, further comprising: receiving a blended image based on the composite image from one or more graphics processing units (GPUs); generating an overlap plot based on the blended image; and sending the overlap plot to the one or more GPUs.

Aspect 7: The method of any one of aspects 1-6, wherein the detecting an overlap pattern further comprises generating one or more lens regions from the set of slice images of the porous media sample.

Aspect 8: The method of aspect 7, further comprising: determining one or more common points shared by any of the set of slice images of the porous media sample; determining a center point shared by each of the set of slice images of the porous media sample; and extracting coordinates for the one or more lens regions from the set of slice images of the porous media sample based on the center point and the one or more common points.

Aspect 9: The method of aspect 8, further comprising: computing a similarity index; and based on the similarity index, registering the one or more lens regions based on the coordinates; or updating the set of overlap distances.

Aspect 10: The method of any one of aspects 1-9, wherein the detecting further comprises obtaining mutual information based on one or more overlapping lens regions of any of the set of slice images of the porous media sample.

Aspect 11: The method of aspect 10, wherein the detecting further comprises comparing intensity patterns in the set of slice images of the porous media sample to the mutual information.

Aspect 12: The method of any one of aspects 1-11, wherein the set of overlap distances is based at least on part on an axial configuration, a 45 degree planetary configuration, a 54 degree planetary configuration, or a 60 degree planetary configuration of the set of slice images of the porous media sample.

Aspect 13: The method of any one of aspects 1-12, further comprising generating one or more intensity histograms for each of the one or more lens regions.

Aspect 14: The method of any one of aspects 1-13, wherein registering comprises transforming the set of slice images of the porous media sample from a set of moving images to a set of static images.

Aspect 15: The method of any one of aspects 1-14, wherein the porous media sample is a digital rock sample.

Aspect 16: A method for image processing by one or more graphics processing units (GPU), comprising: receiving, from one or more CPUs, a composite image based at least in part on a set of overlap distances for a set of slice images of a porous media sample; determining pixel values for each pixel of the composite image; and based on the pixel values, generating a blended image corresponding to the set of slice images of the porous media sample.

Aspect 17: The method of aspect 16, wherein the composite image comprises at least a first slice image of the set of slice images and a second slice image of the set of slice images, wherein the first slice image and the second slice image are overlapping.

Aspect 18: The method of any one of aspects 16-17, further comprising sending the blended image to the one or more CPUs.

Aspect 19: The method of any one of aspects 16-18, wherein generating the blended image comprises: determining a weighted average of the pixel values of the composite images; stacking the composite image based on the weighted average of the pixel values; and based on the stacking, blending the composite image.

Aspect 20: The method of any one of aspects 16-19, further comprising: obtaining a first data set that includes at least one high-resolution image and at least one low-resolution image generated from the high-resolution image; training a generator network using the first data set to generate a second data set that includes at least one super resolution image and a plurality of weights based, at least in part, on one or more low-resolution images; and training a discriminator network using the second data set and reference information, wherein the discriminator network updates the reference information by minimizing perceptual loss.

Aspect 21: The method of aspect 20, wherein the at least one high-resolution image is the blended image.

Aspect 22: The method of any one of aspects 20-21, wherein the low-resolution image is based on down-sampling of the high-resolution image.

Aspect 23: The method of any one of aspects 20-22, further comprising introducing, at each epoch, noisy pixel values between 50 and 95 to the first data set.

Aspect 24: The method of any one of aspects 20-23, further comprising, at each epoch, training the generator network by determining losses through a pixel-wise loss function and updating weights accordingly through backwards propagation.

Aspect 25: The method of any one of aspects 20-24, wherein the training of the generator network is completed after a number of epochs.

Aspect 26: The method of any one of aspects 20-25, wherein the training of the generator network continues until a peak signal to noise ratio (PSNR) is constant.

Aspect 27: The method of any one of aspects 16-26, further comprising: generating a down-sampled image based on the blended image; applying a trained neural network to the down-sampled image to produce a super-resolution image; validating the super-resolution image using a trained discriminator network; and outputting the super-resolution image.

Aspect 28: The method of aspect 16-27, further comprising: receiving a coordinate plot from the one or more CPUs based on the blended image; generating a normalized image based on at least the coordinate plot; and sending the normalized image to the one or more CPUs.

Aspect 29: The method of any one of aspects 16-28, wherein generating a blended image comprises: determining a lower stack, an upper stack, and at least one domain size from a set of sliced images of a porous media sample; decomposing each of the set of slice images based on the at least one domain size; and generating a map of an overlap of the lower stack and the upper stack based on the decomposing.

Aspect 30: The method of aspect 29, wherein the domain size is adjusted to ensure load balancing.

Aspect 31: The method of any one of aspects 29-30, wherein the at least on domain size comprises a uniform volume of some of the set of slices images when the set of slices images lies within the lower stack or the upper stack, and wherein the at least on domain size comprises a leftover volume of some of the set of slices images when the set of slices images lies at a boundary of the lower stack or the upper stack.

Aspect 32: The method of any one of aspects 29-31, where generating a map further comprises: determining a first buffer region for the lower stack corresponding to a second buffer region for the upper stack; determining a first registered region for the lower stack corresponding to a second registered region for the upper stack; and determining a first isolated region for the lower stack corresponding to a second isolated region for the upper stack; and discarding the first and second isolated regions.

Aspect 33: The method of any one of aspects 29-32, further comprising: determining a first registered region for the lower stack corresponding to a second registered region for the upper stack; and generating a stitched vertical image based on at least the first registered region and the second registered region.

Aspect 34: The method of any one of aspects 16-30, wherein the porous media sample is a digital rock sample.

Aspect 35: A non-transitory computer-readable medium comprising computer-executable instructions that, when executed by one or more processors, cause one or more central processing units (CPUs) to perform a method of imaging, comprising: detecting an overlap pattern for a set of slice images of a porous media sample; based on the overlap pattern, determining a set of overlap distances for the set of slice images of the porous media sample; and registering, based on at least the set of overlap distances, a composite image comprising any of the set of slice images of the porous media sample.

Aspect 36: A non-transitory computer-readable medium comprising computer-executable instructions that, when executed by one or more processors, cause one or more graphics processing units (GPUs) to perform a method of imaging, comprising: code for receiving, from one or more CPUs, a composite image based at least in part on a set of overlap distances for a set of slice images of a porous media sample; code for determining pixel values for each pixel of the composite image; and code for, based on the pixel values, generating a blended image corresponding to the set of slice images of the porous media sample.

Aspect 37: An apparatus, comprising: a memory comprising executable instructions; and a processor configured to execute the executable instructions and cause the apparatus to perform a method in accordance with any one of Aspects 1-36.

Aspect 38: An apparatus, comprising means for performing a method in accordance with any one of Aspects 1-36.

Aspect 39: A non-transitory computer-readable medium comprising executable instructions that, when executed by a processor of an apparatus, cause the apparatus to perform a method in accordance with any one of Aspects 1-36.

Aspect 40: A computer program product embodied on a computer-readable storage medium comprising code for performing a method in accordance with any one of Aspects 1-36.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). The singular forms "a," "an," and "the" include plural referents, unless the context clearly dictates otherwise. Within a claim, reference to an element in the singular is not intended to mean "one and only one" unless specifically so stated, but rather "one or more." Unless specifically stated otherwise, the term "some" refers to one or more.

As used herein, the term "determining" encompasses a wide variety of actions. For example, "determining" may include calculating, computing, processing, deriving, investigating, updating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, simulating, choosing, establishing, and the like.

The methods disclosed herein comprise one or more operations or actions for achieving the methods. The method operations and/or actions may be interchanged with one another without departing from the scope of the claims. In other words, unless a specific order of operations or actions is specified, the order and/or use of specific operations and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in the figures, those operations may have corresponding counterpart means-plus-function components with similar numbering.

When the word "approximately" or "about" are used, this term may mean that there may be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

As used, terms such as "first" and "second" are arbitrarily assigned and are merely intended to differentiate between two or more components of a system, an apparatus, or a composition. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is envisioned under the scope of the various embodiments described.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

Unless defined otherwise, all technical and scientific terms used have the same meaning as commonly understood by one of ordinary skill in the art to which these systems, apparatuses, methods, processes and compositions belong.

The following claims are not intended to be limited to the embodiments provided but rather are to be accorded the full scope consistent with the language of the claims.

What is claimed is:

1. A method for image processing by one or more processors comprising:

scanning one or more 2D slice images to form a set of 2D slice images of a porous media sample;

detecting, at one or more central processing units (CPUs), an overlap pattern for a first 2D slice image of the set of 2D slice images of a porous media sample and a first adjacent 2D slice image of the set of 2D slice images that is overlapping the first 2D slice image, wherein the overlap pattern is based on mutual information shared by the first 2D slice image and first adjacent 2D slice image;

detecting, at the one or more central processing units (CPUs), an overlap pattern for a second 2D slice image of the set of 2D slice images of a porous media sample and a second adjacent 2D slice image of the set of 2D slice images that is overlapping the second 2D slice image, wherein the overlap pattern is based on mutual information shared by the second 2D slice image and the second adjacent 2D slice image;

based on the overlap pattern, determining a set of overlap distances for the set of 2D slice images of the porous media sample;

registering, based on at least the set of overlap distances:

a first 2D composite image comprising the first 2D slice image and the first adjacent 2D slice image;

a second 2D composite image comprising the second 2D slice image and the second adjacent 2D slice image; and stacking the first 2D composite image and the second 2D composite image to form a 3D composite image;

receiving at one or more graphics processing units (GPUs) from the one or more CPUs the 3D composite image based at least in part on a set of overlap distances for the set of 2D slice images of a porous media sample;

determining pixel values for each pixel of the 3D composite image; and based on the pixel values, generating a blended 3D image corresponding to the set of 2D slice images of the porous media sample.

2. The method of claim 1, wherein the set of overlap distances comprise orientation information for the set of 2D slice images of the porous media sample.

3. The method of claim 1, further comprising:

applying a single image super-resolution (SR-GAN) to the 3D blended image.

4. The method of claim 1, wherein scanning one or more 2D slice images to form a set of 2D slice images of a porous media sample is performed by a micro-CT scanner.

5. The method of claim 1, further comprising:

receiving the 3D blended image based on the 3D composite image from the one or more GPUs;

generating an overlap plot based on the 3D blended image; and sending the overlap plot to the one or more GPUs.

6. The method of claim 1, further comprising:

determining one or more common points shared by any of the set of 2D slice images of the porous media sample;

determining a center point shared by each of the set of 2D slice images of the porous media sample; and extracting coordinates for one or more lens regions from the set of 2D slice images of the porous media sample based on the center point and the one or more common points.

7. The method of claim 6, further comprising:

computing a similarity index; and based on the similarity index, registering the one or more lens regions based on the coordinates; or updating the set of overlap distances.

8. The method of claim 1, wherein generating the blended 3D image comprises:

determining a weighted average of the pixel values of the first 2D composite image and the second 2D composite image;

stacking the first 2D composite image and the second 2D composite image based on the weighted average of the pixel values; and based on the stacking, blending the 3D composite image.

9. The method of claim 1, further comprising:

obtaining a first data set that includes at least one high-resolution image and at least one low-resolution image generated from the high-resolution image;

training a generator network using the first data set to generate a second data set that includes at least one super resolution image and a plurality of weights based, at least in part, on one or more low-resolution images; and training a discriminator network using the second data set and reference information, wherein the discriminator network updates the reference information by minimizing perceptual loss.

10. The method of claim 9, wherein the at least one high-resolution image is the 3D blended image.

11. The method of claim 9, wherein the low-resolution image is based on down-sampling of the high-resolution image.

12. The method of claim 9, further comprising, at each epoch, training the generator network by determining losses through a pixel-wise loss function and updating weights accordingly through backwards propagation.

13. The method of claim 1, further comprising:

generating a down-sampled image based on the 3D blended image;

applying a trained neural network to the down-sampled image to produce a super-resolution image;

validating the super-resolution image using a trained discriminator network; and outputting the super-resolution image.

14. The method of claim 1, further comprising:

receiving a coordinate plot from the one or more CPUs based on the 3D blended image;

generating a normalized image based on at least the coordinate plot; and sending the normalized image to the one or more CPUs.

15. The method of claim 1, wherein generating a blended image comprises:

determining a lower stack, an upper stack, and at least one domain size from a set of 2D sliced images of a porous media sample;

decomposing each of the set of 2D slice images based on the at least one domain size; and generating a map of an overlap of the lower stack and the upper stack based on the decomposing.

16. The method of claim 15, where generating a map further comprises:

determining a first buffer region for the lower stack corresponding to a second buffer region for the upper stack;

determining a first registered region for the lower stack corresponding to a second registered region for the upper stack; and determining a first isolated region for the lower stack corresponding to a second isolated region for the upper stack; and discarding the first and second isolated regions.

17. The method of claim 15, further comprising:

determining a first registered region for the lower stack corresponding to a second registered region for the upper stack; and generating a stitched vertical image based on at least the first registered region and the second registered region.

18. An apparatus for predicting dynamic two-phase fluid flow in a water-wet porous medium comprising a memory and one or more processors configured to cause the apparatus to:

scan one or more 2D slice images to form a set of 2D slice images of a porous media sample;

detect an overlap pattern for a 2D slice image of the set of 2D slice images of a porous media sample and each adjacent 2D slice image of the set of 2D slice images that is overlapping the 2D slice image, wherein the overlap pattern is based on mutual information shared by the 2D slice image and each adjacent 2D slice image;

based on the overlap pattern, determine a set of overlap distances for the set of 2D slice images of the porous media sample;

register, based on at least the set of overlap distances, a 2D composite image comprising the 2D slice image and the adjacent 2D slice image;

receive, from one or more CPUs, the 2D composite image based at least in part on a set of overlap distances for a set of 2D slice images of a porous media sample;

determine pixel values for each pixel of the 2D composite image; and based on the pixel values, generate a 2D blended image corresponding to the set of 2D slice images of the porous media sample.

19. The apparatus of claim 18, further comprising the one or more processors being configured to cause the apparatus to:

determine a lower stack, an upper stack, and at least one domain size from a set of 2D slice images of a porous media sample;

decompose each of the set of 2D slice images based on the at least one domain size;

generate a map of an overlap of the lower stack and the upper stack based on the decomposing;

determine a first registered region for the lower stack corresponding to a second registered region for the upper stack; and generating a stitched vertical image based on at least the first registered region and the second registered region.

20. A non-transitory computer-readable medium for pore network generation comprising computer-executable instructions that, when executed by one or more processors, cause one or more processing units to:

Scan one or more 2D slice images to form a set of 2D slice images of a porous media sample;

detect, at one or more central processing units (CPUs), an overlap pattern for a first slice image of the set of 2D slice images of a porous media sample and a first adjacent 2D slice image of the set of 2D slice images that is overlapping the first 2D slice image wherein the overlap pattern is based on mutual information shared by the first 2D slice image and the first adjacent 2D slice image;

detect, at the one or more central processing units (CPUs), an overlap pattern for a second 2D slice image of the set of 2D slice images of a porous media sample and a second adjacent 2D slice image of the set of 2D slice images that is overlapping the second 2D slice image, wherein the overlap pattern is based on mutual information shared by the second 2D slice image and the second adjacent 2D slice image;

based on the overlap pattern, determine a set of overlap distances for the set of 2D slice images of the porous media sample; and register, based on at least the set of overlap distances:

a first 2D composite image comprising the first 2D slice image and the first adjacent 2D slice image;

a second 2D composite image comprising the second 2D slice image and the second adjacent 2D slice image; and stacking the first 2D composite image and the second 2D composite image to form a 3D composite image;

receive, at one or more graphics processing units (GPUs) from one or more CPUs, the 3D composite image based at least in part on a set of overlap distances for the set of 2D slice images of a porous media sample;

determine pixel values for each pixel of the 3D composite image; and based on the pixel values, generate a blended 3D image corresponding to the set of 2D slice images of the porous media sample.

* * * * *